United States Patent
Maeda

(10) Patent No.: US 8,089,169 B2
(45) Date of Patent: Jan. 3, 2012

(54) POWER CONTROL SYSTEM OF VEHICLE

(75) Inventor: Shunichi Maeda, Anjo (JP)

(73) Assignee: Denso Corporation, Kariya (JP)

(*) Notice: Subject to any disclaimer, the term of this patent is extended or adjusted under 35 U.S.C. 154(b) by 543 days.

(21) Appl. No.: 12/292,442

(22) Filed: Nov. 19, 2008

(65) Prior Publication Data

US 2009/0200993 A1 Aug. 13, 2009

(30) Foreign Application Priority Data

Feb. 8, 2008 (JP) ................. 2008-029458

(51) Int. Cl.
*H02K 11/00* (2006.01)
(52) U.S. Cl. ...................... 290/40 C; 322/44
(58) Field of Classification Search ............... 290/40 C, 290/40 B; 320/104, 132, 149, 150; 322/24, 322/28, 44
See application file for complete search history.

(56) References Cited

U.S. PATENT DOCUMENTS

| | | | |
|---|---|---|---|
| 2002/0149357 A1* | 10/2002 | Morimoto et al. | 324/150 |
| 2007/0170778 A1 | 7/2007 | Yamaguchi | |
| 2007/0298316 A1* | 12/2007 | Yamamoto et al. | 429/62 |

FOREIGN PATENT DOCUMENTS

| | | |
|---|---|---|
| JP | A-2001-185228 | 7/2001 |
| JP | A-2003-68366 | 3/2003 |
| JP | A-2003-088191 | 3/2003 |
| JP | A-2004-254483 | 9/2004 |
| JP | A-2007-97336 | 4/2007 |
| JP | A-2007-191097 | 8/2007 |
| JP | A-2007-322234 | 12/2007 |

OTHER PUBLICATIONS

US english machine translation of JP2004-254483, all pages.*
Dec. 8, 2009 Office Action issued in Japanese Patent Application No. 2008-029458 (w/ translation).

* cited by examiner

*Primary Examiner* — Quyen Leung
*Assistant Examiner* — Naishadh Desai
(74) *Attorney, Agent, or Firm* — Oliff & Berridge, PLC

(57) ABSTRACT

A power control system of a vehicle has a battery, an alternator, and a battery condition detecting device. The device has detecting units detecting the battery current supplied to or discharged from the battery, the battery voltage and the battery temperature, a communicating unit receiving conditions of the alternator such as power generation ratio, generated voltage, alternator speed and failure information from the alternator through a communication line, and a malfunction judging unit judging, from the battery current, the battery voltage, the battery temperature and the conditions of the alternator, whether or not a malfunction has occurred in one of the alternator, the battery and the detecting units. In response to the judgment that a malfunction has occurred in one of the alternator, the battery and the detecting units, a notifying unit notifies the occurrence of the malfunction.

58 Claims, 15 Drawing Sheets

POWER GENERATION CONDITION SIGNAL

POWER GENERATION CONTROL SIGNAL

POWER CONTROL SYSTEM OF VEHICLE

CROSS-REFERENCE TO RELATED APPLICATION

This application is based upon and claims the benefit of priority of the prior Japanese Patent Application 2008-029458 filed on Feb. 8, 2008, so that the contents of which are incorporated herein by reference.

BACKGROUND OF THE INVENTION

1. Field of the Invention

The present invention relates generally to a power control system of a vehicle such as a passenger car, a truck or the like, and more particularly to the system for controlling power generation of an alternator according to conditions of a battery in the vehicle.

2. Description of Related Art

To detect the electric current flowing through a battery and the battery voltage, a current sensor and a voltage sensor have been used. Further, to detect malfunctions of the sensors, a sensor malfunction detecting device is well known. This device is, for example, disclosed in Published Japanese Patent First Publication No. 2003-68366. In this device, a data processing unit is used only for detecting a malfunction of the current sensor and a malfunction of the voltage sensor, and a display notifies the occurrence of the malfunction.

Further, to control a quantity of electric power generated in an alternator mounted on a vehicle, an alternator controlling device is known. This device is, for example, disclosed in Published Japanese Patent First Publication No. 2007-97336. In this device, a temperature sensor detects the battery temperature, and an electronic control unit (ECU) controls electric power generated in the alternator according to the battery temperature. When the ECU detects a malfunction of the temperature sensor, a display such as a warning lamp is switched on under control of the ECU to notify the occurrence of the malfunction.

However, in the alternator controlling device and the malfunction detecting device, to notify the occurrence of a malfunction, it is required to additionally install a display in an instrument panel. Therefore, the area of the panel for on-board installation is undesirably increased, and the manufacturing cost of the device is increased.

To avoid the additional installation of a display notifying malfunctions of various sensors, it is thinkable to use a single alarm as the combination of a display (e.g., a warning lamp notifying insufficient power generation) notifying a malfunction of an alternator and another display notifying malfunctions of various sensors. However, in this case, it is required to additionally install an electric circuit for producing an alarm signal and inducing the alarm to output the warning sound in response to the alarm signal. Therefore, the manufacturing cost of the device is undesirably increased.

Further, when a judgment on a malfunction of each of various sensors is performed independent from a judgment on a malfunction of an alternator to output a warning indicating the occurrence of a malfunction in one of the sensors or the alternator, the precision in the judgment is sometimes lowered. For example, even when the electric power supplied to the battery is sufficient, the device undesirably outputs a warning indicating that the voltage of electric power generated in the alternator is low. When the device is set so as to excessively heighten sensitivity in the judgment, the device frequently outputs unnecessary warnings. In contrast, when the device is set so as to excessively lower sensitivity in the judgment, the device sometimes output no warning even when the output voltage of the alternator or the battery voltage is excessively lowered so as to require a warning.

SUMMARY OF THE INVENTION

An object of the present invention is to provide, with due consideration to the drawbacks of the conventional, a power control system of a vehicle which reliably performs a judgment on a malfunction occurring in the system with high precision while suppressing the increase of an area required for on-board installation of the system or the increase in the manufacturing cost of the system.

According to an aspect of this invention, the object is achieved by the provision of a power control system of a vehicle comprising a battery, an alternator that generates electric power to charge the battery with the electric power, a battery condition detecting device detecting conditions of the battery, and a communication line through which the alternator and the battery condition detecting device communicate with each other. The battery condition detecting device comprises a battery current detecting unit for detecting a first electric current supplied from the alternator to the battery and a second electric current discharged from the battery, a battery voltage detecting unit for detecting a voltage of the battery at a terminal of the battery, a battery temperature detecting unit for detecting a temperature of the battery, a communicating unit for receiving a power generation condition signal containing a power generation condition of the alternator from the alternator through the communication line, a malfunction judging unit for judging, from the electric currents detected by the battery current detecting unit, the battery voltage detected by the battery voltage detecting unit, the battery temperature detected by the battery temperature detecting unit and the power generation condition signal received by the communicating unit, whether or not a malfunction has occurred in one of the alternator, the battery and the detecting units or the occurrence of the malfunction is predicted, and a notifying unit for notifying the occurrence of the malfunction or the prediction of the malfunction occurrence in response to the judgment of the malfunction judging unit that a malfunction has occurred in one of the alternator, the battery and the detecting units or the occurrence of the malfunction is predicted.

With this structure of the power control system, the malfunction judging unit judges from the electric currents supplied to and discharged from the battery, the battery voltage, the battery temperature and the power generation condition of the alternator that a malfunction has occurred in one of the alternator, the battery and the detecting units or the occurrence of the malfunction is predicted. Then, the notifying unit notifies the occurrence of the malfunction or the prediction of the malfunction occurrence.

Because the battery condition detecting device receives the electric currents supplied to and discharged from the battery, the device can be also used as a data processing unit for producing a control signal according to the electric currents to control the power generation of the alternator. Therefore, in this system, no data processing unit privately used for judging the occurrence of a malfunction is required. Accordingly, the power control system can be manufactured at a low cost.

Further, because the notifying unit notifies the occurrence of the malfunction or the prediction of the malfunction occurrence, a display installed in an instrument panel and used to indicate the operation of the alternator can also be used to output the notification of the notifying unit to an occupant of the vehicle. Accordingly, the increase of the area of the panel for on-board installation can be suppressed, and the system can notify the occurrence of the malfunction or the prediction of the malfunction occurrence to an occupant of the vehicle while using the display.

Moreover, not only does the system judge whether the occurrence of a malfunction in the alternator is detected, but also the system judges the occurrence of a malfunction in the battery or one of the detecting units. Accordingly, the power control system can reliably perform a judgment on a malfunction occurring in the alternator, the battery or one of the detecting units with high precision.

Furthermore, no electronic control unit (ECU) for controlling the alternator is used in the system. Accordingly, the processing load on the ECU can be reduced.

DETAILED DESCRIPTION OF THE PREFERRED EMBODIMENTS

An embodiment of the present invention will now be described with reference to the accompanying drawings.

Embodiment

Figure 1:
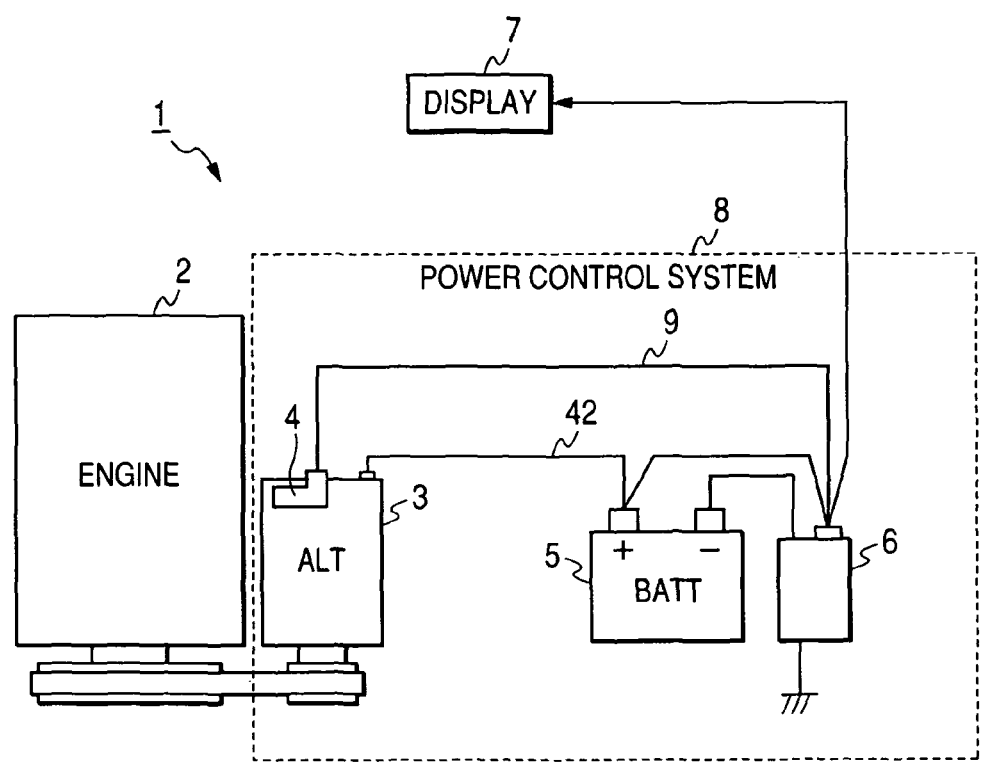
FIG. 1 is a view schematically showing the whole configuration of a vehicle system including a power control system according to an embodiment of the present invention.

FIG. 1 is a view schematically showing the whole configuration of a vehicle system including a power control system according to this embodiment.

As shown in FIG. 1, a vehicle system 1 mounted on a vehicle has an internal combustion engine 2, a power control system 8 and a display 7. The engine 2 generates a rotational force. The system 8 has an alternator 3 for generating electric power from the rotational force, a battery 5 for storing the electric power supplied from the alternator 3 through a charging line 42, and a battery condition detecting device 6 for detecting conditions of the battery 5 in a plurality of detecting units, receiving a power generation condition signal indicating power generation conditions of the alternator 3 from the alternator 3 through a communication line 9 and judging from the conditions of the battery 5 and the power generation conditions of the alternator 3 whether or not a malfunction has occurred in the alternator 3, the battery 5 or one of the detecting units. The display 7 displays the malfunction in response to the judgment of the device 6.

The alternator 3 has a power controlling device 4 for detecting the power generation conditions of the alternator 3, transmitting the power generation condition signal indicating the power generation conditions to the device 6, inducing the device 6 so as to produce a power generation control signal from the conditions of the battery 5 and the power generation conditions of the alternator 3, receiving the power generation control signal from the device 6, and controlling the electric power generated in the alternator 3 according to the power generation control signal.

In the alternator 3, a belt (not shown) receives the rotational force of the engine 2, and a rotor is rotated in response to the rotational force. Therefore, the alternator 3 generates electric power from the rotational force. A portion of the electric power is supplied to the battery 5, and the other portion of the electric power is used to operate current consumers. The power controlling device 4 is attached to the alternator 3. The device 4 adjusts an exciting current flowing through the alternator 3 to control the voltage of electric power outputted from the alternator 3.

The battery 5 has a positive electrode terminal connected with an output terminal of the alternator 3 and a negative electrode terminal connected with the earth. The battery voltage is an electric potential difference between the electrode terminals. The battery current detecting device 6 is attached to a case of the battery 5 to be disposed near the battery 5. The device 6 is connected with each of the electrode terminals of the battery 5. Therefore, the battery 5 is earthed through the device 6.

The display 7 is installed in an instrument panel of the vehicle to be connected with the device 6. The display 7 outputs various warnings including a malfunction warning which indicates the occurrence of a malfunction in the alternator 3, the battery 5 or the device 6.

Figure 2:
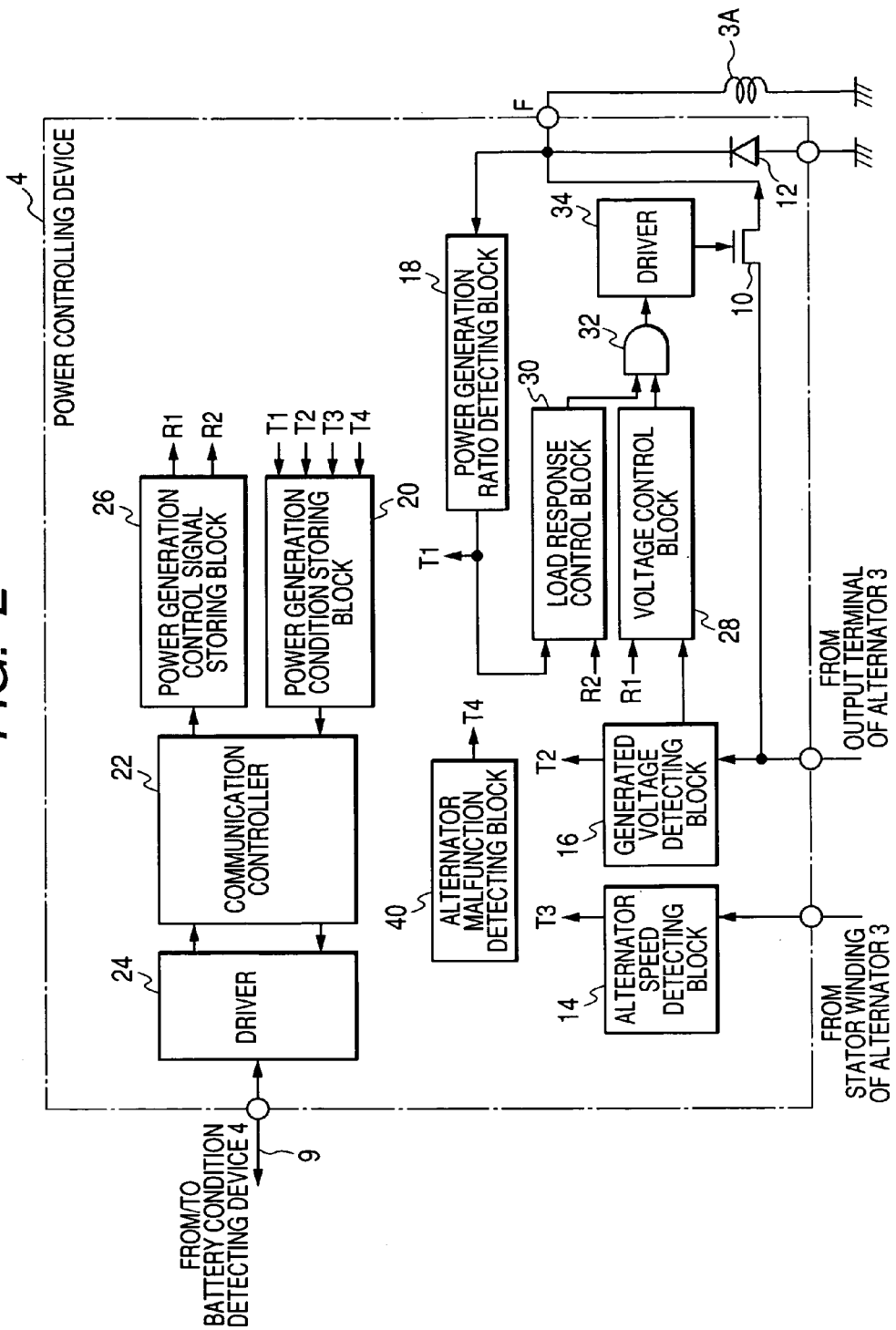
FIG. 2 is a block diagram of a power controlling device of the power control system shown in FIG. 1.

FIG. 2 is a block diagram of the power controlling device 4. As shown in FIG. 2, the device 4 has a power transistor 10 through which an exciting current is supplied from an output terminal of the alternator 3 to an excitation winding 3A of the alternator 3 to rotate a rotor (not shown) of the alternator 3 at a rotational speed (hereinafter, called an alternator speed), a circulation diode 12 through which the exciting current is circulated when the transistor 10 is turned off, an alternator speed detecting block 14 for detecting the number of revolutions per second in the rotor of the alternator 3 as an alternator speed T3, a generated voltage detecting block 16 for detecting the voltage at the output terminal of the alternator 3 as a power generated voltage T2 of the alternator 3, a power generation ratio detecting block 18 for detecting a ratio (i.e., duty ratio) of an actually-generated power to a maximum generated power as a power generation ratio T1, and an alternator malfunction detecting block 40 for detecting a malfunction or a failure occurring in the alternator 3 and producing failure information T4 indicating a failure content (e.g., power generation stop, non-controlled power generation, overheat, low voltage of the generated power or the like). Operation conditions (i.e., power generating conditions) of the alternator 3 are indicated by the power generation ratio T1, the power generated voltage T2, the alternator speed T3 and the failure information T4.

The transistor 10 is serially connected with the excitation winding 3A of the alternator 3. Therefore, when the transistor 10 is turned on, an excitation current is supplied to the winding 3A, and the alternator 3 generates electric power corresponding to the excitation current. The diode 12 is connected with the excitation winding 3A in parallel. Therefore, when the transistor 10 is turned off, the excitation current flowing through the winding 3A is circulated through the diode 12. The detecting block 14 monitors a frequency of phase voltages at phase windings of a stator winding (not shown) of the alternator 3 to detect the alternator speed T3. The detecting block 18 monitors a change in a voltage at a terminal F connecting the transistor 10 and winding 3A to detect the power generation ratio T1. The detecting block 40 performs one of well-known malfunction (or failure) detecting methods. When the block 40 detects a malfunction or failure occurring in the alternator 3, the block 40 produces and outputs failure information T4 indicating a failure content. The detecting block 40 may output a one-bit signal (set at a high or low level) indicating the occurrence of a failure without specifying any failure content.

The device 4 further has a power generation condition storing block 20 for storing a value of the power generation ratio T1, a value of the generated power voltage T2 and a value of the alternator speed T3 detected in the respective blocks 18, 16 and 14 as power generation conditions of the alternator 3. When the detecting block 40 produces the failure information T4, the storing block 20 additionally stores the failure information T4 as a power generation condition of the alternator 3. The storing block 20 may additionally store a value of the exciting current flowing through the excitation winding 3A of the alternator 3, or the storing block 20 may store only one of the power generation conditions T1 to T4.

The device 4 further has a driver 24 connected with the device 6 through the communication line 9, a communication controller 22 for transmitting a power generation condition signal indicating the power generation conditions T1 to T4 of the alternator 3 to the device 6 through the driver 24 and the communication line 9 and receiving a power generation control signal containing an instruction R1 of a generated power voltage and an instruction R2 of a load response control from the device 6 through the driver 24 and the communication line 9, and a power generation control signal storing block 26 for storing the power generation control signal.

Figure 3:
FIG. 3 is a view showing a frame format of a power generation condition signal transmitted from the device shown in FIG. 2.

FIG. 3 is a view showing a frame format of the power generation condition signal. As shown in FIG. 3, the power generation ratio T1, the alternator speed T3, the generated power voltage T2 and the failure information T4 are arranged in that order in a transmission frame of the power generation condition signal.

Figure 4:
FIG. 4 is a view showing a frame format of a power generation control signal received in the device shown in FIG. 2.

FIG. 4 is a view showing a frame format of the power generation control signal. As shown in FIG. 4, the instruction R1 of the generated power voltage and the instruction R2 of the load response control are arranged in that order in a transmission frame of the power generation control signal.

The controller 22 modulates the power generation condition signal of the power generation conditions T1 to T4 to a digital modulated signal set at a predetermined format for digital communication and transmits the digital modulated signal to the device 6. The controller 22 updates contents of the power generation conditions T1 to T4 every predetermined period of time to transmit the updated contents of the power generation conditions T1 to T4 to the device 6. The controller 22 demodulates a digital modulated signal transmitted from the device 6 to produce the power generation control signal.

The device 4 further has a voltage control block 28 for producing a voltage control signal required to adjust the generated power voltage T2 to a predetermined adjusted voltage value specified by the instruction R1, a load response control block 30 for producing a load response control signal required to perform a load response control for the alternator 3 for the purpose of changing the power generation ratio T1 to a value specified by the instruction R2, a logical multiply circuit 32 for performing the logical multiply for the voltage control signal and the load response control signal to produce a logical multiply signal, and a driver 34 for receiving the logical multiply signal as a driving signal and operating the power transistor 10 according to the logical multiply signal.

Figure 5:
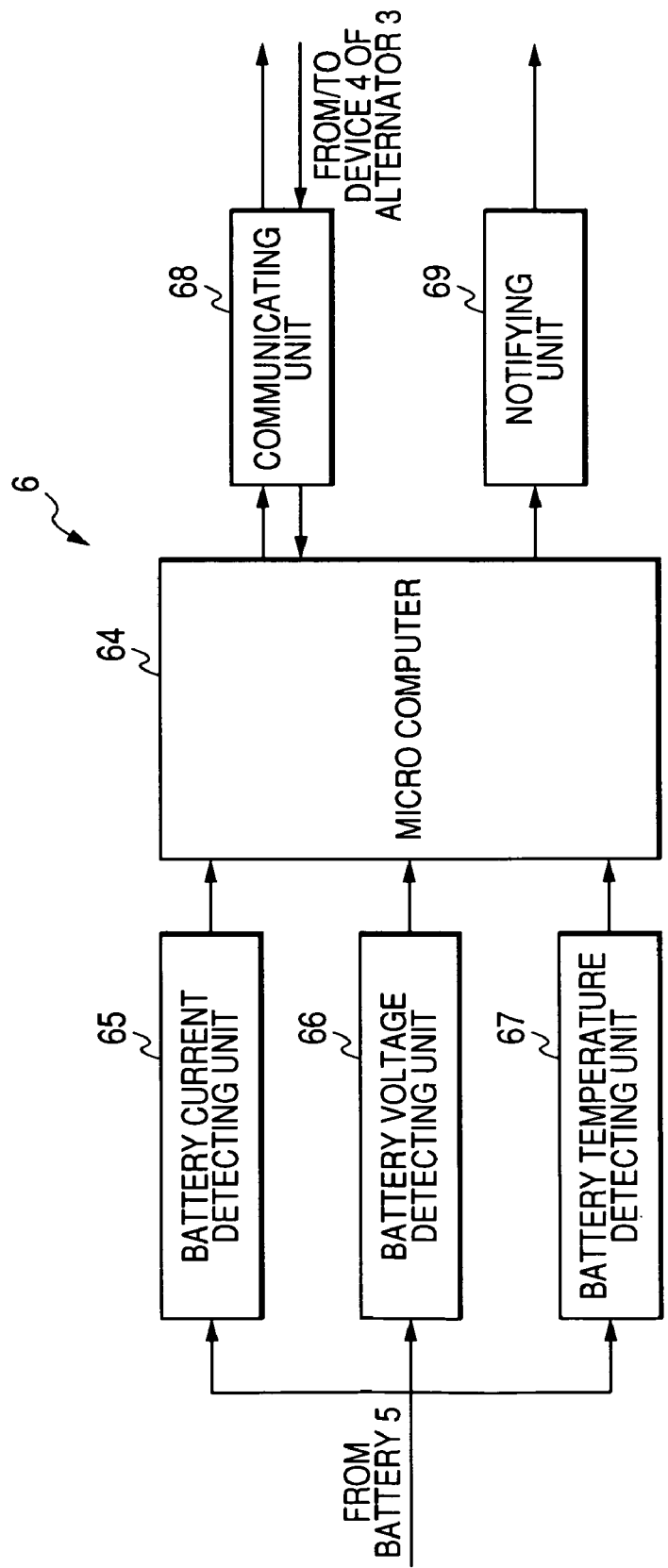
FIG. 5 is a block diagram of a battery condition detecting device of the power control system shown in FIG. 1.

FIG. 5 is a block diagram of the battery condition detecting device 6. As shown in FIG. 5, the device 6 has a battery current detecting unit 65 for detecting battery currents Ib such as an electric current, with which the battery 5 is charged, and an electric current discharged from the battery 5, a battery voltage detecting unit 66 for detecting the voltage Vb of the battery 5 at a positive electrode terminal of the battery 5, a battery temperature detecting unit 67 for detecting the temperature Tb of the battery 5, a communicating unit 68 for receiving the power generation condition signal from the device 4 through the communication line 9, a microcomputer 64 for judging from the battery currents Ib, the battery voltage Vb and the battery temperature Tb detected by the respective units 65, 66 and 67 and the power generation condition signal received by the communicating unit 68 whether or not a malfunction has occurred in one of the alternator 3, the battery 5 and the detecting units 65 to 67, and a notifying unit 69 for notifying the occurrence of the malfunction to an occupant of the vehicle when the microcomputer 64 judges that the malfunction has occurred. The microcomputer 64 acts as a malfunction judging unit.

Figure 6:
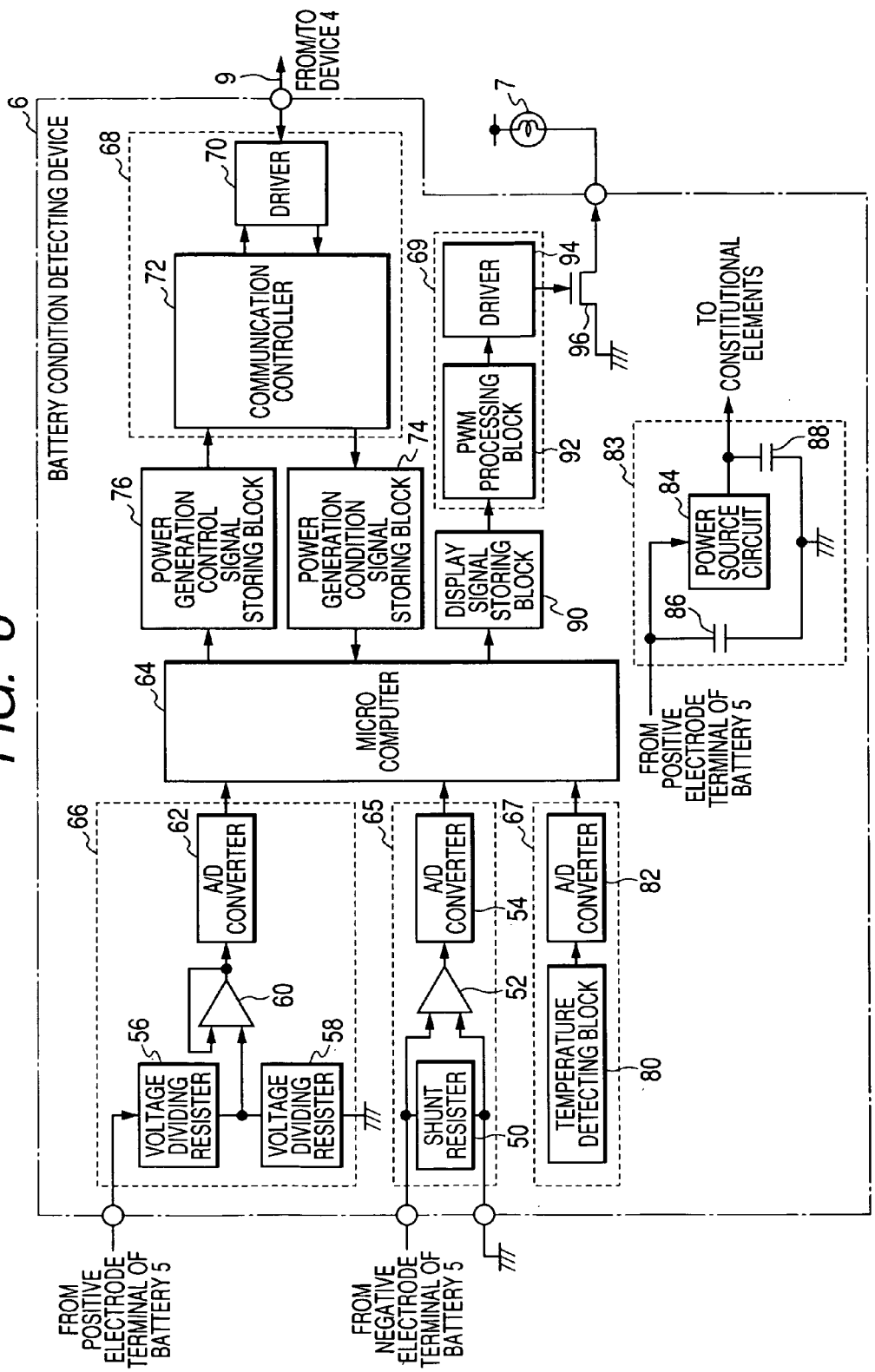
FIG. 6 is a block diagram showing an example of the battery condition detecting device shown in FIG. 5.

FIG. 6 is a block diagram showing an example of the battery condition detecting device 6. As shown in FIG. 6, the detecting unit 65 has a shunt resistor 50 through which the negative electrode terminal of the battery 5 is earthed, a differential amplifier 52 for amplifying the voltage difference between both terminals of the resistor 50, and an analog-to-digital (A/D) converter 54 for converting the amplified voltage difference into first digital data. An electric current, with which the battery 5 is charged, or an electric current discharged from the battery 5 passes through the shunt resistor 50. The first digital data indicates the value of the electric current. As the electric current supplied to or discharged from the battery 5 is increased, the voltage difference in the resistor 50 is increased.

The detecting unit 66 has a pair of voltage dividing resistors 56 and 58 through which the positive electrode terminal of the battery 5 is earthed, an operational amplifier 60 for outputting a voltage signal of which the level is equal to the voltage at a connecting point between the resistors 56 and 58, and an A/D converter 62 for converting the level of the voltage signal into second digital data. The second digital data indicates the voltage of the battery 5. As the voltage of the battery 5 is increased, the level of the voltage signal is increased. The amplifier 60 acts as a buffer connected with an output terminal of a voltage dividing circuit having the resistors 56 and 58.

The detecting unit 67 has a temperature detecting block 80, directly attached to a case of the battery 5, for detecting the temperature of the battery 5 and outputting a temperature signal of which the level changes with the detected temperature, and an A/D converter 82 for converting the level of the temperature signal into third digital data. The third digital data indicates the temperature of the battery 5. The microcomputer 64 receives the first digital data, the second digital data and the third digital data from the respective converters 54, 62 and 82 every predetermined period of time and calculates battery conditions such as a charging rate of electric power in the battery 5.

The communicating unit 68 has a driver 70 and a communication controller 72 for receiving the power generation condition signal indicating the power generation conditions T1 to T4 of the alternator 3 from the device 4 through the communication line 9 and the driver 70. The controller 72 demodulates the digital modulated signal transmitted from the device 4 to reproduce the power generation condition signal. The device 6 may further have a power generation condition signal storing block 74 for storing the power generation condition signal received in the controller 72.

The microcomputer 64 determines the instructions R1 and R2 from the battery conditions and the power generation conditions T1 to T4 of the alternator 3 and produces a power generation control signal containing the instructions R1 and R2. The device 4 adjusts the voltage of electric power generated in the alternator 3 according to a parameter determined by the instruction R1 while performing a load response control for the alternator 3 according to a control parameter determined by the instruction R2.

Further, the microcomputer 64 judges from the conditions of the battery 5 and the power generation conditions T1 to T4 of the alternator 3 whether or not a malfunction or failure has occurred in the alternator 3, the battery 5 or one of the detecting blocks 18, 16, 14 and 40. The microcomputer 64 further predicts the occurrence of a malfunction or failure in the alternator 3, the battery 5 or one of the detecting blocks 18, 16, 14 and 40 according to the conditions of the battery 5 and the power generation conditions T1 to T4 of the alternator 3. The microcomputer 64 produces a display signal indicating the occurrence of a malfunction or prediction of the occurrence of a malfunction.

The device 6 may further have a power generation control signal storing block 76 for storing the power generation control signal produced in the microcomputer 64 and a display signal storing block 90 for storing the display signal produced in the microcomputer 64. The controller 72 modulates the power generation control signal of the block 76 to a digital modulated signal set at a predetermined format for digital communication and transmits the digital modulated signal to the device 4 through the driver 70 and the communication line 9.

The notifying unit 69 has a pulse width modulation (PWM) processing block 92 for performing the pulse width modulation for the display signal to produce a notifying signal, a transistor 96, and a driver 94 for driving the transistor 96 in response to the notifying signal to turn on and off the transistor 96. The display 7 is lit on when the transistor 96 is turned on.

The device 6 may further have a power source unit 83 for supplying electric power to the constitutional elements of the device 6 to operate the constitutional elements. The unit 83 has a power source circuit 84 receiving electric power from the battery 5, and a pair of capacitors 86 and 88 connected in parallel to each other to be in parallel to the circuit 84. One terminal of each of the capacitors 86 and 88 is connected with the positive electrode terminal of the battery 5, and the other terminal is earthed.

With this structure of the devices 4 and 6 described above, an operation of the power control system 8 is now described below.

The power controlling device 4 produces a power generation condition signal containing power generation conditions T1 to T3 every predetermined period. When the detecting block 40 detects a failure of the alternator 3, the signal additionally contains failure information T4 indicating the failure of the alternator 3. The battery condition detecting device 6 receives the power generation condition signal from the device 4 through the communication line 9. In the device 6, the units 65 to 67 detect battery conditions such as a battery current Ib, a battery voltage Vb and a battery temperature Tb. Then, the microcomputer 64 produces a power generation control signal containing an instruction R1 of a generated power voltage and an instruction R2 of a load response control. This signal is transmitted to the device 4 through the communication line 9. The device 4 controls the electric power generated in the alternator 3 according to the instructions R1 and R2.

Further, the microcomputer 64 performs a judgment operation according to the battery conditions and the power generation conditions T1 to T4 every predetermined period. This judgment operation of the microcomputer 64 will be described in detail with reference to FIG. 7 to FIG. 16.

Figure 7:
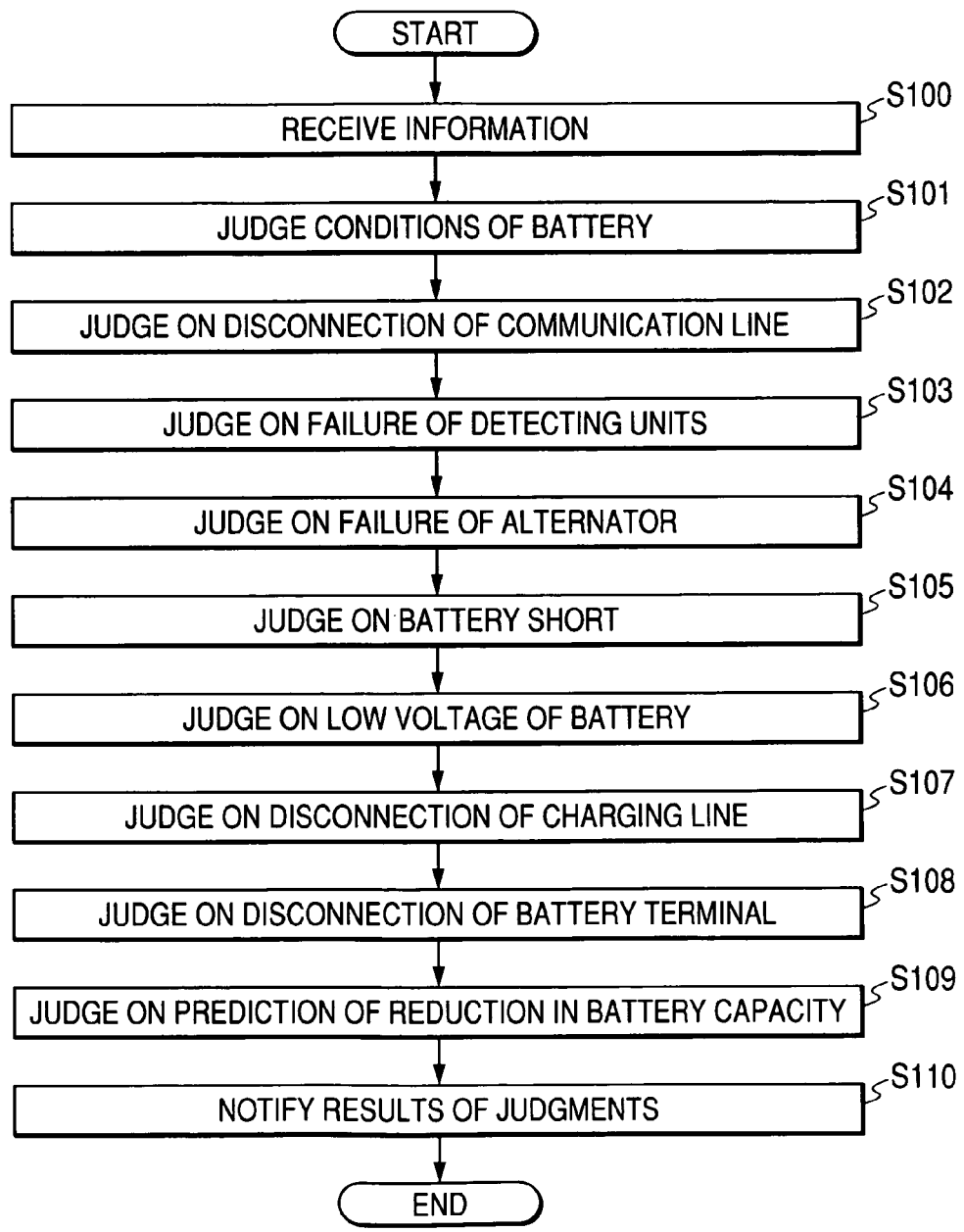
FIG. 7 is a flow chart showing an operation of a microcomputer of the device shown in FIG. 6.

FIG. 7 is a flow chart showing an operation of the microcomputer 64 of the battery condition detecting device 6.

As shown in FIG. 7, at step S100, the microcomputer 64 receives various types of information relating to the battery 5 and the alternator 3 every predetermined period of time. More specifically, the microcomputer 64 receives data of the electric current Ib supplied to or discharged from the battery 5, data of the battery voltage Vb and data of the battery temperature Tb from the respective units 65 to 67. Further, when the power generation condition signal is transmitted from the device 4 to the device 6 through the communication line 9, the microcomputer 64 receives the power generation ratio T1 of the alternator 3, the generated power voltage T2 of the alternator 3, the alternator speed T3 and the failure information T4 from the device 4.

At step S101, the microcomputer 64 judges conditions of the battery 5 from the received information relating to the battery 5. More specifically, the microcomputer 64 calculates a charging rate of the battery 5 or a quantity of electricity accumulated in the battery 5. For example, a quantity of electricity accumulated in the battery 5 (hereinafter, called a residual quantity of the battery 5) is calculated from a difference between the sum of the electric current supplied to the battery 5 and the sum of the electric current discharged from the battery 5. Further, a residual quantity of the battery 5 can be calculated from the battery voltage Vb at the positive electrode terminal of the battery 5. The charging rate is calculated from the battery rating and the residual quantity of the battery 5.

At step S102, the microcomputer 64 judges whether or not the communication line 9 is disconnected from the device 4 or 6. At step S103, the microcomputer 64 judges whether or not a malfunction or failure has occurred in at least one of the detecting units 65, 66 and 67. At step S104, the microcomputer 64 judges whether or not a malfunction or failure has occurred in the alternator 3. At step S105, the microcomputer 64 judges whether or not a battery short has occurred in the battery 5 due to a short circuit formed in the battery 5. At step S106, the microcomputer 64 judges whether or not the voltage of the battery 5 is too low to operate current consumers. At step S107, the microcomputer 64 judges whether or not the charging line 42 is disconnected from the alternator 3. At step S108, the microcomputer 64 judges whether or not the charging line 42 is disconnected from the positive electrode terminal of the battery 5. At step S109, the microcomputer 64 judges whether or not a residual quantity of the battery 5 will be extremely reduced in the near future. That is, the microcomputer 64 judges whether or not the reduction in a residual quantity of the battery 5 (or a low capacity of the battery 5) is predicted. At step S110, the microcomputer 64 notifies results of the judgments to an occupant of the vehicle while using the notifying unit 69. The display 7 displays the result of each judgment notified by the unit 69.

Figure 8:
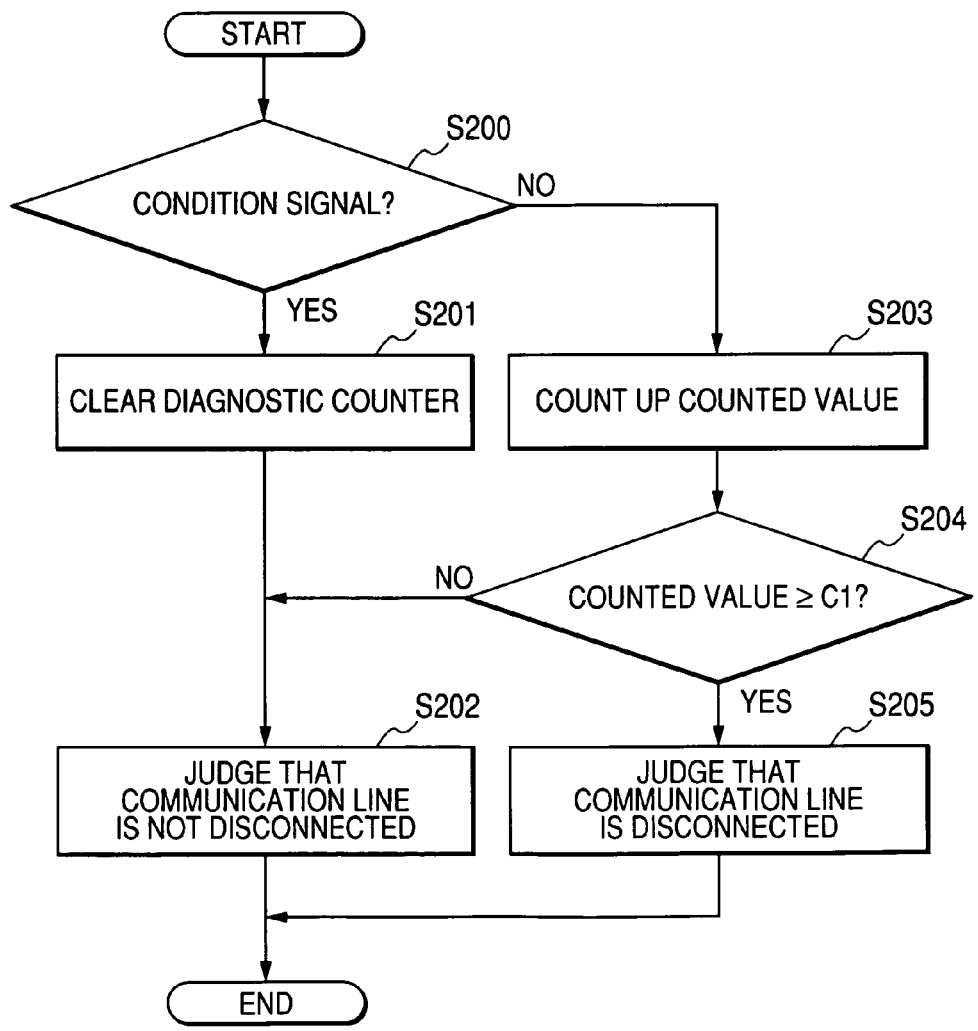
FIG. 8 is a flow chart showing a process in a judging operation at step S102 shown in FIG. 7.

FIG. 8 is a flow chart showing a process in the judgment at step S102. The microcomputer 64 performs a process shown in FIG. 8 for the judgment on the disconnection of the communication line 9.

When the communication line 9 is disconnected from the device 4 or 6, a failure occurring in the alternator 3 cannot be notified to the device 6. Therefore, an occupant of the vehicle cannot recognize that the battery 5 receives no electric power from the alternator 3, so that the battery 5 is dead. When the battery 5 is nearly dead, it is difficult to start the driving operation of the engine 2. Therefore, it is important to notify a disconnection of the communication line 9 to the occupant when the disconnection has occurred.

As shown in FIG. 8, at step S200, the microcomputer 64 judges whether or not the microcomputer 64 receives a power generation condition signal from the device 4. In case of an affirmative judgment at step S200, at step S201, the microcomputer 64 clears or resets a communication line diagnostic counter. Then, at step S202, the microcomputer 64 judges or detects that the communication line 9 is not disconnected from the device 4 or 6. In contrast, In case of the negative judgment at step S200, at step S203, the microcomputer 64 counts up a counted value of the counter. This counter is used to measure a continuation time during which the microcomputer 64 receives no power generation condition signal from the device 4. This measurement of the continuation time is performed in a software process by the microcomputer 64. Then, at step S204, the microcomputer 64 judges whether or not the counted value of the counter is equal to or higher than a predetermined count value C1. In other words, the microcomputer 64 judges whether or not the continuation time is longer than a predetermined time value. When the counted value is lower than the predetermined value (negative judgment at step S204), the microcomputer 64 judges that the continuation time is not sufficient to finally judge on the communication line 9. Therefore, the microcomputer 64 judges at step S202 that the communication line 9 is not disconnected from the device 4 or 6. In contrast, when the counted value is equal to or higher than the predetermined value (affirmative judgment at step S204), the microcomputer 64 judges or detects at step S205 that a failure has occurred in the communication line 9 because of the disconnection of the line 9 from the device 4 or 6.

Accordingly, before the engine 2 is stopped, the power control system 8 can inform an occupant that it is difficult to restart the driving operation of the engine 2.

Figure 9:
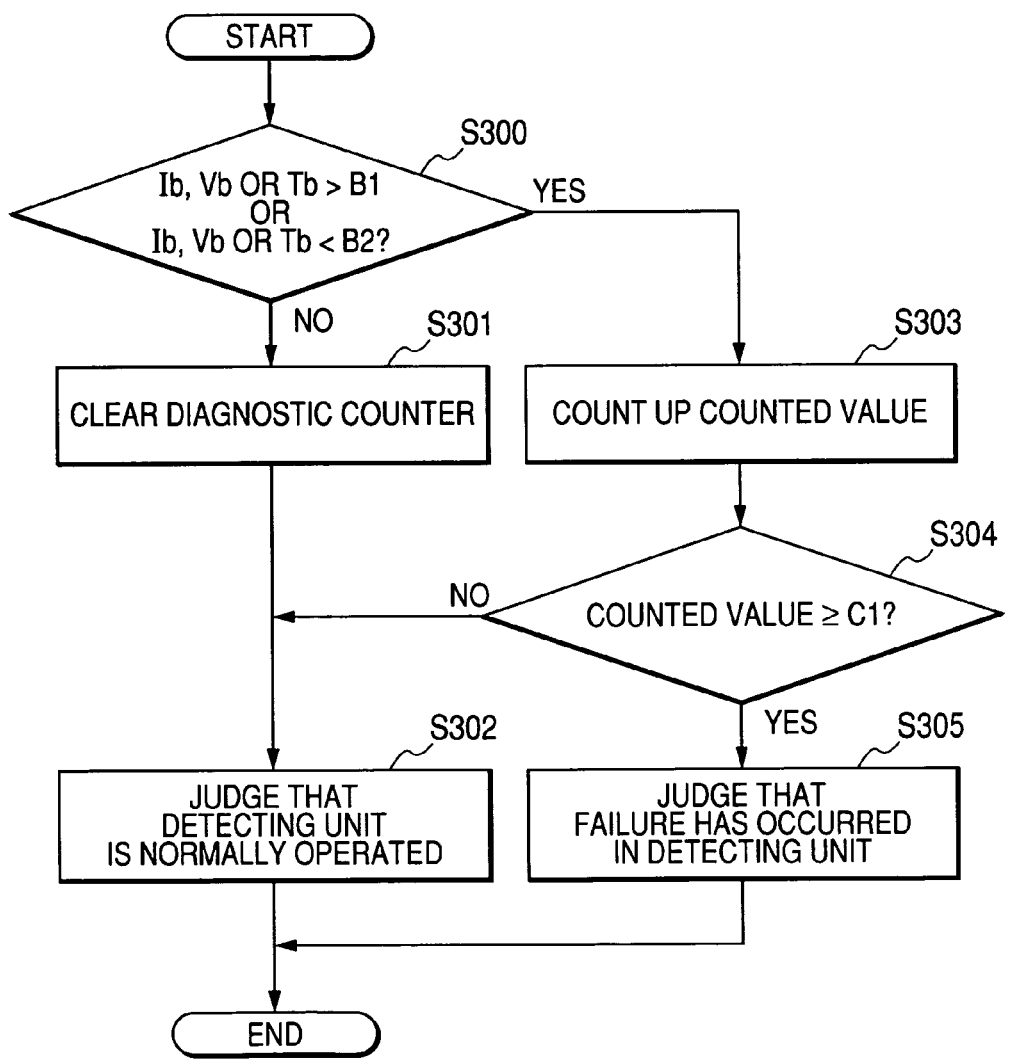
FIG. 9 is a flow chart showing a process in a judging operation at step S103 shown in FIG. 7.

FIG. 9 is a flow chart showing a process in the judgment at step S103. The microcomputer 64 performs a process shown in FIG. 9 for the judgment on a malfunction or failure in at least one of the units 65, 66 and 67.

When a failure occurs in at least one of the detecting units 65 to 67, the system 8 cannot detect a failure occurring in the battery 5 or a disconnection of the charging line 42. Further, the system 8 cannot correctly detect a failure occurring in the alternator 3. Therefore, it is important to notify a failure occurring in at least one of the detecting units 65 to 67.

Further, when the detecting unit 65 is normally operated, the first digital data of the converter 54 indicating the value of the electric current Ib supplied to or discharged from the battery 5 is placed between an upper current value and a lower current value. When the detecting unit 66 is normally operated, the second digital data of the converter 62 indicating the value of the battery voltage Vb is placed between an upper voltage value and a lower voltage value. When the detecting unit 67 is normally operated, the third digital data of the converter 82 indicating the value of the battery temperature Tb is placed between an upper temperature value and a lower temperature value. When a malfunction or failure occurs in at least one of the units 65, 66 and 67, the digital data is placed out of the normal range between the upper and lower values. In this case, the system 8 cannot detect a malfunction or failure such as dead battery or battery overheat occurring in the battery 5.

As shown in FIG. 9, at step S300, the microcomputer 64 judges from the first, second or third digital data whether or not the measured value such as the battery current Ib, the battery voltage Vb or the battery temperature Tb is higher than an upper value B1 or is lower than a lower value B2. When the measured value is placed within the normal range (negative judgment), a diagnostic counter for current, voltage or temperature detection is cleared or reset at step S301. Then, at step S302, the microcomputer 64 judges or detects that the detecting unit 65, 66 or 67 is normally operated.

In contrast, at step S300, when the measured value is placed out of the normal range (affirmative judgment), the diagnostic counter counts up a counted value at step S303. Then, at step S304, the microcomputer 64 judges whether or not the counted value of the counter is equal to or higher than a predetermined count value C1. In other words, the microcomputer 64 calculates a continuation time during which the detecting unit 65, 66 or 67 detects the current Ib, voltage Vb or temperature Tb placed out of the normal range and judges whether or not the continuation time is longer than a predetermined time value. When the counted value is lower than the predetermined value (negative judgment), the microcomputer 64 judges that the continuation time is not sufficient to finally judge on the detecting unit 65, 66 or 67. Therefore, the microcomputer 64 judges at step S302 that the detecting unit 65, 66 or 67 is operating normally. In contrast, when the counted value of the counter is equal to or higher than the predetermined value (affirmative judgment), the microcomputer 64 judges or detects at step S305 that a malfunction or failure has occurred in the detecting unit 65, 66 or 67.

Accordingly, before the engine 2 is stopped, the power control system 8 can prevent the difficulty of the driving operation in the engine 2.

The microcomputer 64 performs this process shown in FIG. 9 to detect a malfunction or failure occurring in each of the detecting units 65, 66 and 67.

Figure 10:
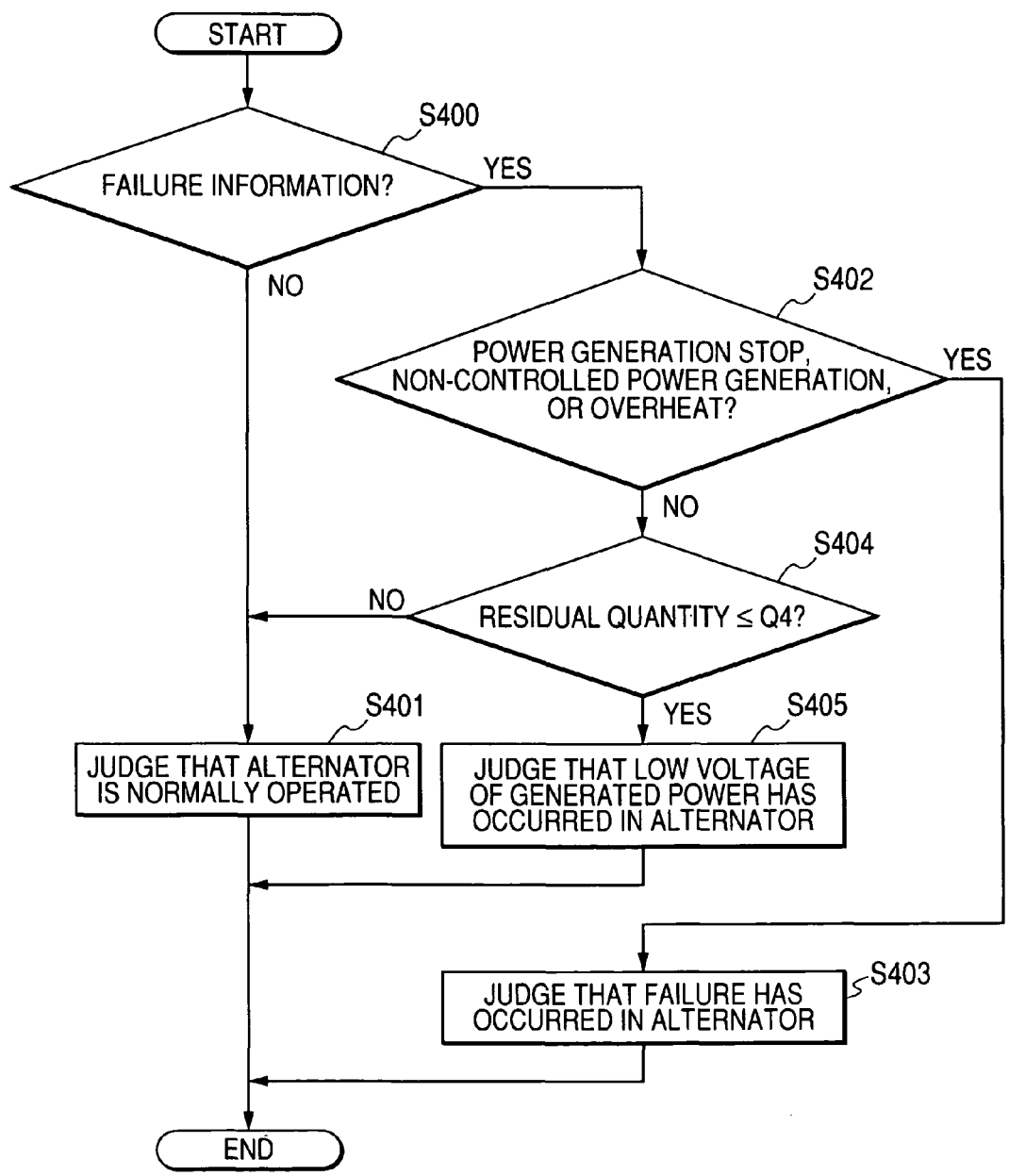
FIG. 10 is a flow chart showing a process in a judging operation at step S104 shown in FIG. 7.

FIG. 10 is a flow chart showing a process in the judgment at step S104. The microcomputer 64 performs a process shown in FIG. 10 for the judgment on a malfunction or failure in the alternator 3.

As shown in FIG. 10, at step S400, the microcomputer 64 judges whether or not failure information T4 of the alternator 3 exists in the power generation condition signal transmitted from the device 4. When no failure information T4 exists in the power generation condition signal (negative judgment), the microcomputer 64 judges or detects at step S401 that the alternator 3 is normally operated. In contrast, when failure information T4 detected in the block 40 exists in the power generation condition signal (affirmative judgment at step S400), the microcomputer 64 acknowledges that a malfunction or failure has occurred in the alternator 3 at a high probability. Therefore, the microcomputer 64 judges at step S402 whether the content of the failure information T4 indicates power generation stop, non-controlled power generation or overheat. When the failure information T4 indicates one of power generation stop, non-controlled power generation and overheat, the microcomputer 64 judges or detects at step S403 that a malfunction or failure such as power generation stop, non-controlled power generation or overheat has occurred in the alternator 3. In contrast, at step S402, when the failure information T4 indicates another failure content such as low voltage of the generated power, the microcomputer 64 judges at step S404 whether or not the residual quantity of the battery 5 is equal to or smaller than a predetermined quantity value Q4. The microcomputer 64 calculates the residual quantity of the battery 5 from a difference between the sum of the electric current supplied to the battery 5 and the sum of the electric current discharged from the battery 5. These electric currents are detected in the detection unit 65. When the residual quantity is larger than the predetermined quantity value Q4 (negative judgment at step S404), it is not required to charge the battery 5 at a high voltage, so that the alternator 3 generates electric power set at a low voltage. Therefore, the microcomputer 64 judges at step S401 that the alternator 3 is normally operated. In contrast, when the residual quantity of the battery 5 is equal to or smaller than the predetermined quantity value Q4 (affirmative judgment at step S404), the alternator 3 should generate electric power set at a high-voltage to charge the battery 5. Therefore, the microcomputer 64 judges or detects at step S405 that low voltage of the generated power has occurred in the alternator 3.

Accordingly, as compared with a judgment on the alternator 3 from power generation conditions of the alternator 3, because the judgment is performed based on the conditions of the battery 5 and the alternator 3, the precision in the judgment can be improved.

Further, a display connected with an alternator in a prior art to indicate a failure occurring in the alternator can be used as the display 7. Accordingly, the system 8 can notify a failure occurring in the alternator 3 without increasing the area of an instrument panel for on-board installation.

Figure 11:
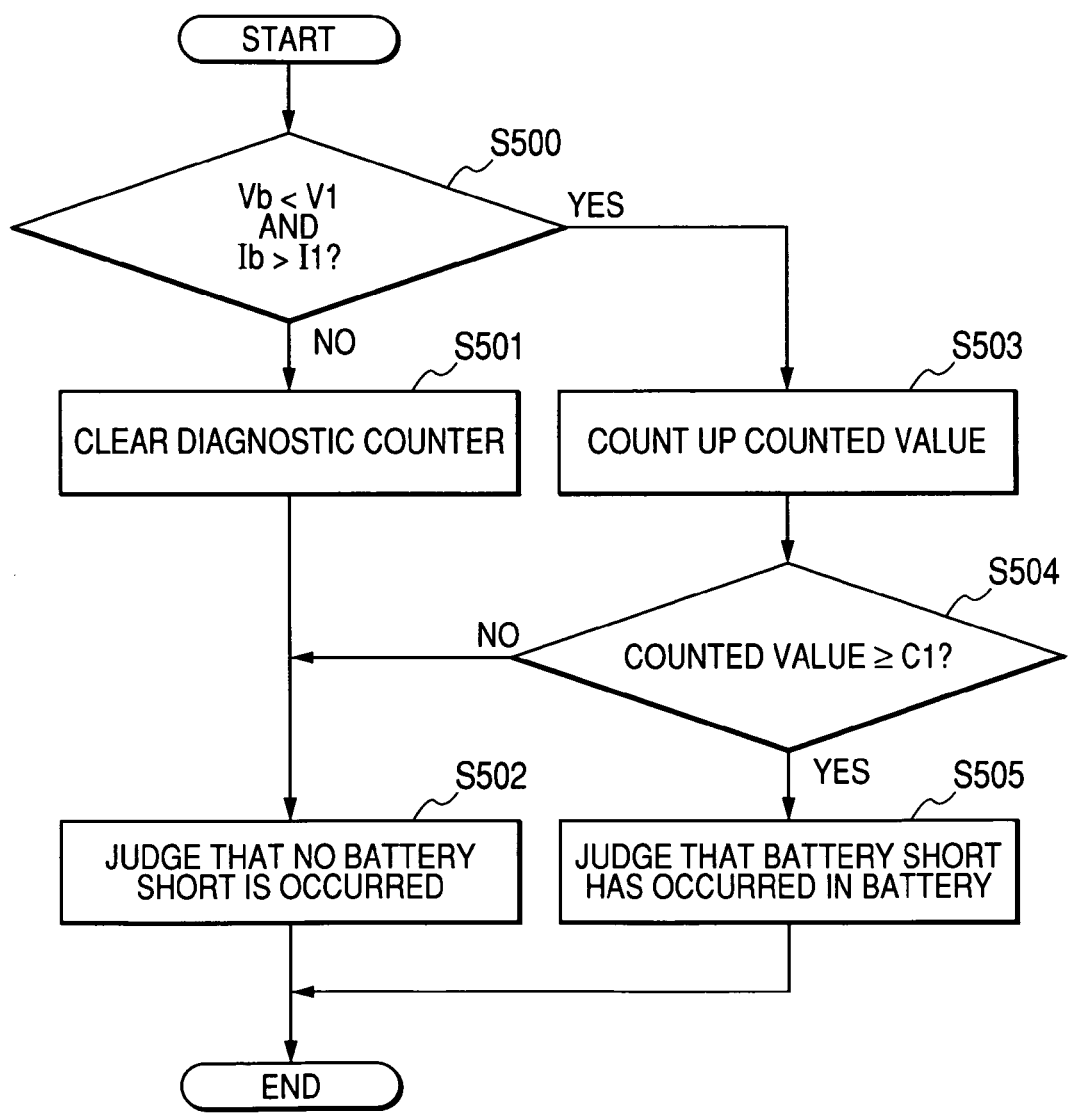
FIG. 11 is a flow chart showing a process in a judging operation at step S105 shown in FIG. 7.

FIG. 11 is a flow chart showing a process in the judgment at step S105. The microcomputer 64 performs a process shown in FIG. 11 for the judgment on the battery short.

When a short circuit is formed in the battery 5 so as to cause a battery short in the battery 5, the battery current Ib is heightened while the battery voltage Vb is lowered.

As shown in FIG. 11, at step S500, the microcomputer 64 judges whether or not the battery voltage Vb detected in the unit 66 is lower than a predetermined voltage value V1 while the battery current Ib detected in the unit 65 is higher than a predetermined current value I1. When the battery voltage Vb equal to or higher than the predetermined voltage value or the battery current Ib equal to or lower than the predetermined current value is satisfied (negative judgment), a battery short diagnostic counter is cleared or reset at step S501. Then, at step S502, the microcomputer 64 judges or detects that no battery short occurs in the battery 5.

In contrast, when the battery voltage Vb being lower than the predetermined voltage value and the battery current Ib being higher than the predetermined current value are satisfied (affirmative judgment at step S500), the battery short counter counts up a counted value at step S503. Then, at step S504, the microcomputer 64 judges whether or not the counted value of the counter is equal to or higher than a predetermined count value C1. In other words, the microcomputer 64 calculates a continuation time, during which the battery voltage Vb lower than the predetermined voltage value and the battery current Ib higher than the predetermined current value are satisfied, and judges whether or not the continuation time is longer than a predetermined time value. When the counted value is lower than the predetermined value (negative judgment at step S504), the microcomputer 64 judges that the continuation time is not sufficient to finally judge on the battery condition. Therefore, the microcomputer 64 judges at step S502 that no battery short is caused in the battery 5. In contrast, when the counted value of the counter is equal to or higher than the predetermined value (affirmative judgment at step S504), the microcomputer 64 judges or detects at step S505 that a battery short has occurred in the battery 5.

Accordingly, before the engine 2 is stopped, the power control system 8 can inform an occupant that it is difficult to restart the driving operation of the engine 2.

Figure 12:
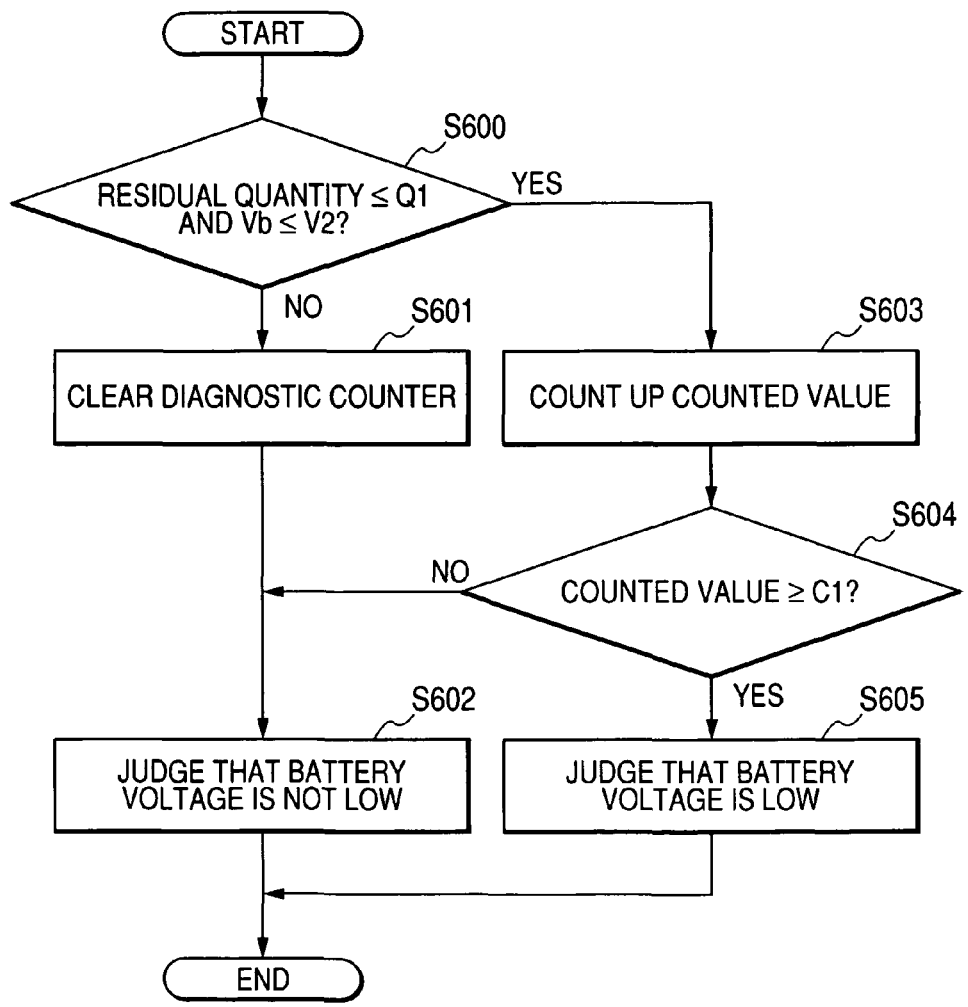
FIG. 12 is a flow chart showing a process in a judging operation at step S106 shown in FIG. 7.

FIG. 12 is a flow chart showing a process in the judgment at step S106. The microcomputer 64 performs a process shown in FIG. 12 for the judgment on the low voltage of the battery 5.

When the battery voltage Vb is placed between a first value and a second value lower than the first value, the battery 5 can supply electric power to current consumers so as to adequately drive the current consumers. Even when the voltage Vb of the battery 5 having a sufficient residual quantity is lower than the first value, the battery voltage Vb is stably maintained to be higher than the second value. In contrast, when the residual quantity of the battery 5 is lowered, the battery voltage placed between the first and second values easily and rapidly becomes lower than the second value. Therefore, to stably drive current consumers, the battery 5 is required to have a large residual quantity or a high voltage.

As shown in FIG. 12, at step S600, the microcomputer 64 judges whether or not the residual quantity of the battery 5 is equal to or lower than a predetermined quantity value Q1 while the battery voltage Vb detected in the unit 66 is equal to or lower than a predetermined voltage value V2. The microcomputer 64 calculates the residual quantity of the battery 5 in the same manner as the calculation at step S404. When the residual quantity higher than the predetermined quantity value or the battery voltage Vb higher than the predetermined voltage value is satisfied (negative judgment), a battery voltage diagnostic counter is cleared or reset at step S601. Then, at step S602, the microcomputer 64 judges or detects that the battery voltage Vb is not low.

In contrast, when the residual quantity equal to or lower than the predetermined quantity value and the battery voltage Vb equal to or lower than the predetermined voltage value are satisfied (affirmative judgment at step S600), the diagnostic counter counts up a counted value at step S603. Then, at step S604, the microcomputer 64 judges whether or not the counted value of the counter is equal to or higher than a predetermined count value C1. In other words, the microcomputer 64 calculates a continuation time, during which the residual quantity of the battery 5 equal to or lower than the predetermined quantity value and the battery voltage Vb equal to or lower than the predetermined voltage value are satisfied, and judges whether or not the continuation time is longer than a predetermined time value. When the counted value is lower than the predetermined value (negative judgment at step S604), the microcomputer 64 judges that the continuation time is not sufficient to finally judge on the battery condition. Therefore, the microcomputer 64 judges at step S602 that the battery voltage Vb is not low. In contrast, when the counted value of the counter is equal to or higher than the predetermined value (affirmative judgment at step S604), the microcomputer 64 judges or detects at step S605 that the battery voltage Vb of the battery 5 is too low, due to a failure occurring in the battery 5, to normally drive current consumers.

Accordingly, before the engine 2 is stopped, the power control system 8 can inform an occupant that it is difficult to restart the driving operation of the engine 2.

Figure 13:
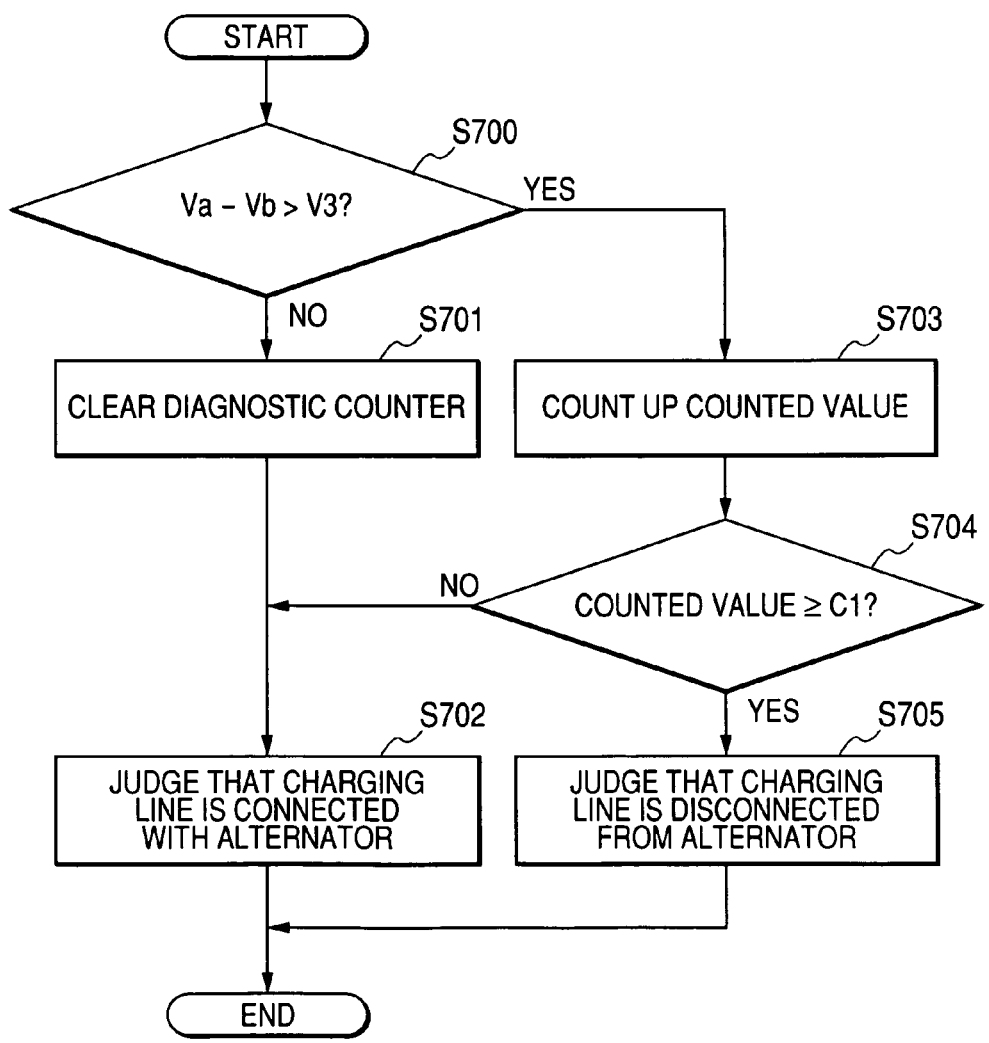
FIG. 13 is a flow chart showing a process in a judging operation at step S107 shown in FIG. 7.

FIG. 13 is a flow chart showing a process in the judgment at step S107. The microcomputer 64 performs a process shown in FIG. 13 for the judgment on the disconnection of the charging line 42.

When the charging line 42 is disconnected from the alternator 3, the battery 5 is not charged by the alternator 3. Therefore, even when the voltage of electric power generated in the alternator 3 is sufficiently high, the battery voltage Vb becomes low so as to enlarge a difference between the generated voltage and the battery voltage Vb.

As shown in FIG. 13, at step S700, the microcomputer 64 judges whether or not a differential voltage obtained by subtracting the battery voltage Vb from the voltage Va of electric power generated in the alternator 3 is larger than a predetermined differential voltage value V3. When the differential voltage is not larger than the predetermined differential voltage value V3 (negative judgment), a charging line diagnostic counter is cleared or reset at step S701. Then, at step S702, the microcomputer 64 judges that the charging line 42 is connected with the alternator 3.

In contrast, when the differential voltage is larger than the predetermined differential voltage value V3 (affirmative judgment at step S700), the diagnostic counter counts up a counted value at step S703. Then, at step S704, the microcomputer 64 judges whether or not the counted value of the counter is equal to or higher than a predetermined count value C1. In other words, the microcomputer 64 calculates a continuation time, during which the differential voltage larger than the predetermined differential voltage value is satisfied, and judges whether or not the continuation time is longer than a predetermined time value. When the counted value is lower than the predetermined value (negative judgment), the microcomputer 64 judges that the continuation time is not sufficient to finally judge on the charging line 42. Therefore, the microcomputer 64 judges at step S702 that the charging line 42 normally connects the alternator 3 and the battery 5. In contrast, when the counted value of the counter is equal to or higher than the predetermined value (affirmative judgment at step S704), the microcomputer 64 judges or detects at step S705 that the charging line 42 is disconnected from the alternator 3.

Accordingly, before the engine 2 is stopped, the power control system 8 can inform an occupant that it is difficult to restart the driving operation of the engine 2.

Figure 14:
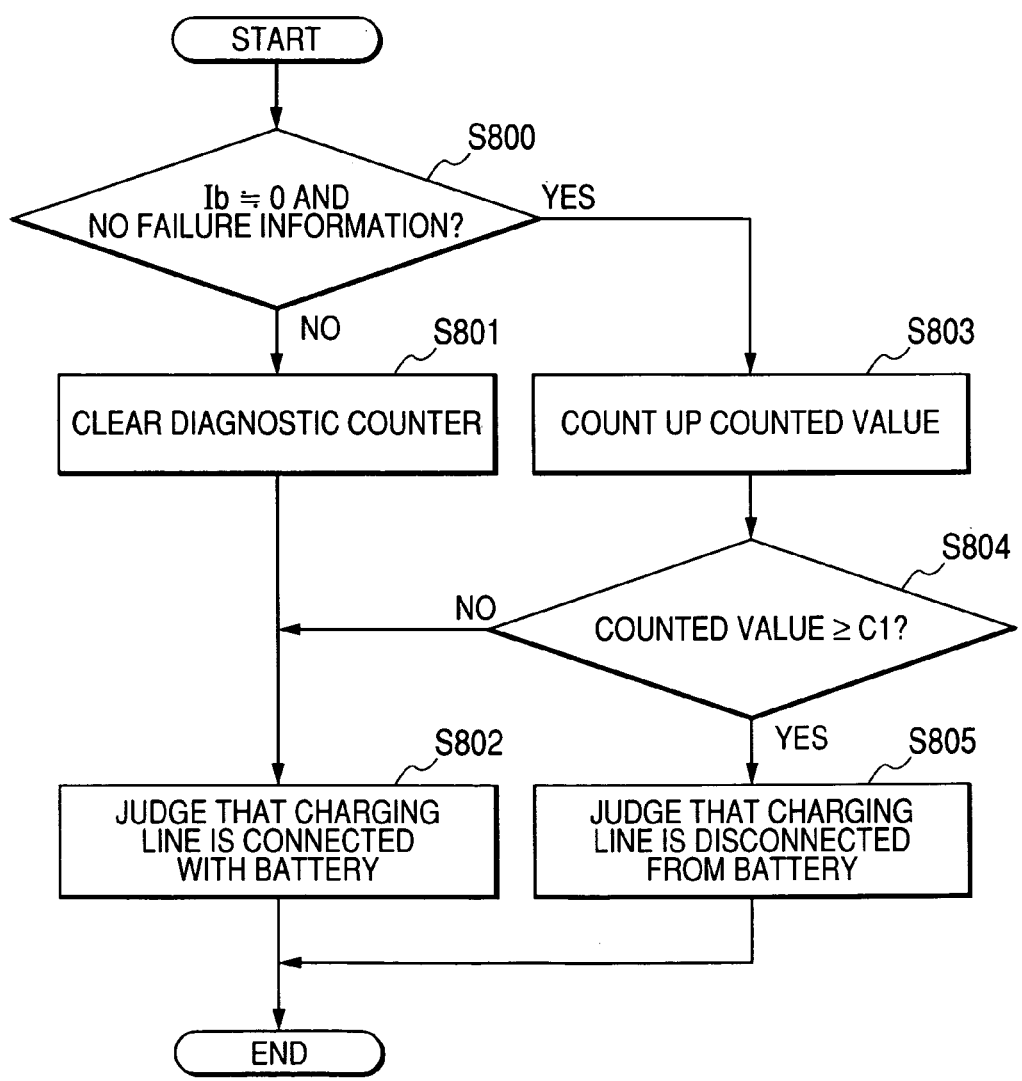
FIG. 14 is a flow chart showing a process in a judging operation at step S108 shown in FIG. 7.

FIG. 14 is a flow chart showing a process in the judgment at step S108. The microcomputer 64 performs a process shown in FIG. 14 for the judgment on the disconnection of the battery terminal.

When the charging line 42 is disconnected from the positive electrode terminal of the battery 5, the battery 5 is not charged by the alternator 3. Therefore, even when the alternator 3 normally generates electric power, the battery 5 will be dead. During the disconnection of the charging line 42 from the battery 5, even when the alternator 3 is normally operated, no electric current is supplied to the battery 5. Therefore, the battery current Ib measured by the detecting unit 65 becomes approximately equal to zero.

As shown in FIG. 14, at step S800, the microcomputer 64 judges whether or not the battery current Ib measured by the detecting unit 65 is approximately equal to zero while no failure information T4 exists in the power generation condition signal transmitted from the device 4. The reception of no failure information T4 denotes that the alternator 3 is normally operated. When the battery current Ib is not near zero or the failure information T4 exists in the power generation condition signal (negative judgment), a battery terminal disconnection diagnostic counter is cleared or reset at step S801. Then, at step S802, the microcomputer 64 judges or detects that the charging line 42 is connected with the battery 5.

In contrast, when the battery current Ib approximately equal to zero and the reception of no failure information T4 are satisfied (affirmative judgment at step S800), the diagnostic counter counts up a counted value at step S803. Then, at step S804, the microcomputer 64 judges whether or not the counted value of the counter is equal to or higher than a predetermined count value C1. In other words, the microcomputer 64 calculates a continuation time, during which the battery current Ib being approximately zero and no failure information T4 are satisfied, and judges whether or not the continuation time is longer than a predetermined time value. When the counted value is lower than the predetermined value (negative judgment), the microcomputer 64 judges that the continuation time is not sufficient to finally judge on the battery terminal. Therefore, the microcomputer 64 judges at step S802 that the charging line 42 is connected with the battery 5. In contrast, when the counted value of the counter is equal to or higher than the predetermined value (affirmative judgment at step S804), the microcomputer 64 judges or detects at step S805 that the charging line 42 is disconnected from the battery 5.

Accordingly, before the engine 2 is stopped, the power control system 8 can inform an occupant that it is difficult to restart the driving operation of the engine 2.

Figure 15:
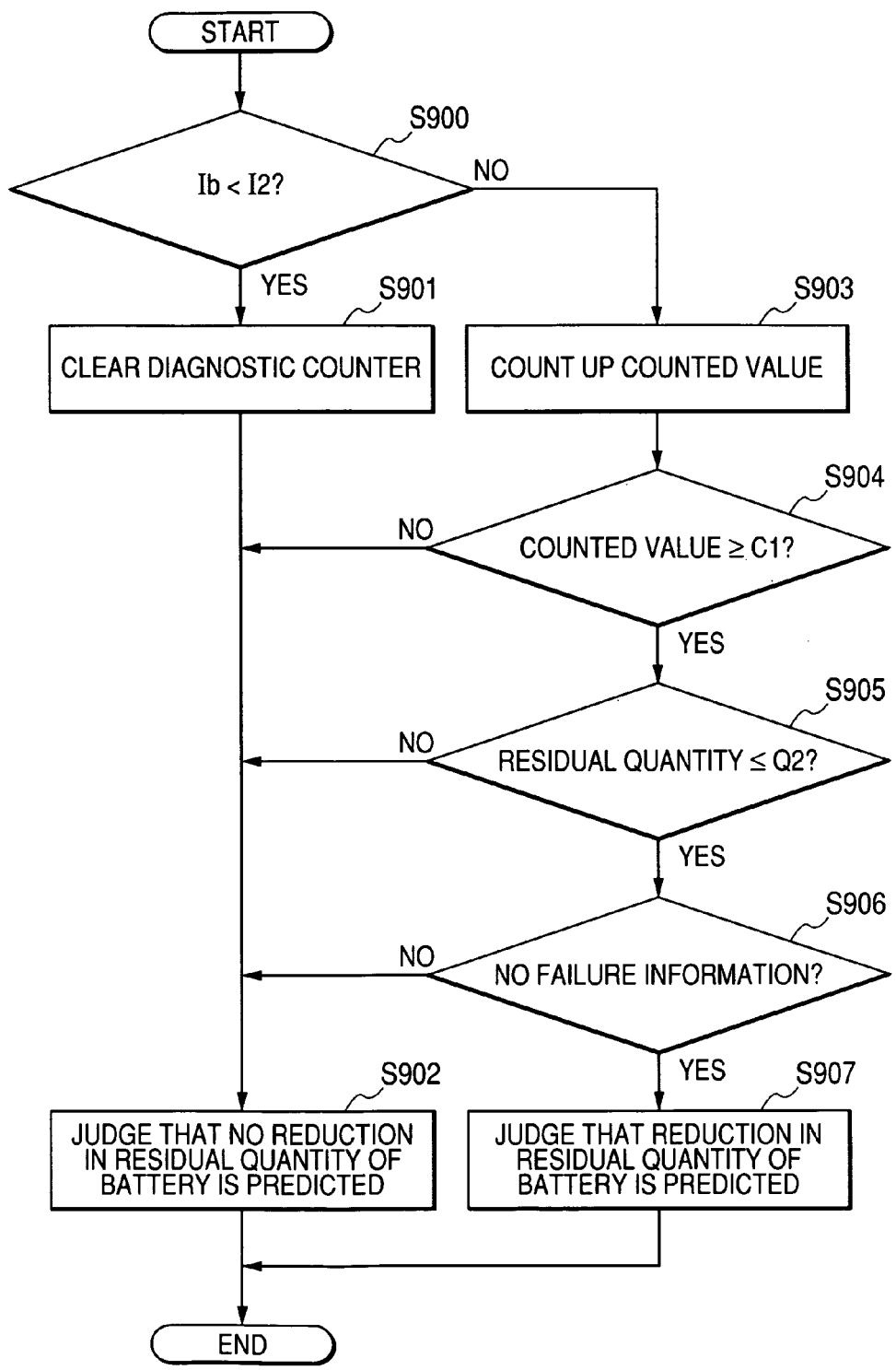
FIG. 15 is a flow chart showing a process in a judging operation at step S109 shown in FIG. 7.

FIG. 15 is a flow chart showing a process in the judgment at step S109. The microcomputer 64 performs a process shown in FIG. 15 for the judgment on the prediction of the reduction in a residual quantity of the battery 5.

In a case where the electric current discharged from the battery 5 is large for a long time such that current consumers sufficiently receive the electric current, the residual quantity of the battery 5 is sometimes reduced even when the alternator 3 is normally operated so as to charge the battery 5. In this case, the current consumers now sufficiently receiving electric power will be not able to sufficiently receive electric power from the battery 5 in the near future. Therefore, it is important to judge whether or not a residual quantity of the battery 5 will be reduced in the near future.

As shown in FIG. 15, at step S900, the microcomputer 64 judges whether or not an electric current Ib discharged from the battery 5 and detected by the detecting unit 65 is smaller than a predetermined current value I2. When the discharged current Id is smaller than the predetermined current value I2 (affirmative judgment), a battery discharge diagnostic counter is cleared or reset at step S901. Then, at step S902, the microcomputer 64 judges that no reduction in a residual quantity of the battery 5 is predicted.

In contrast, when the discharged current Ib is equal to or larger than the predetermined current value I2 (negative judgment at step S900), the diagnostic counter counts up a counted value at step S903. Then, at step S904, the microcomputer 64 judges whether or not the counted value of the counter is equal to or higher than a predetermined count value C1. In other words, the microcomputer 64 calculates a continuation time, during which the discharged current Id smaller than the predetermined current value is satisfied, and judges whether or not the continuation time is longer than a predetermined time value. When the counted value is lower than the predetermined value C1 (negative judgment at step S904), the microcomputer 64 judges at step S902 that no reduction in a residual quantity of the battery 5 is predicted. In contrast, when the counted value of the counter is equal to or higher than the predetermined value C1 (affirmative judgment at step S904), the microcomputer 64 judges at step S905 whether or not the residual quantity of the battery 5 is equal to or lower than a predetermined electricity value Q2. In case of the negative judgment at step S905, the microcomputer 64 judges at step S902 that no reduction in the residual quantity of the battery 5 is predicted. In contrast, in case of the affirmative judgment at step S905, the microcomputer 64 judges at step S906 whether or not the power generation condition signal contains no failure information T4. In case of the negative judgment at step S906, the microcomputer 64 judges at step S902 that no reduction in a residual quantity of the battery 5 is predicted. In contrast, in case of the affirmative judgment at step S906, the microcomputer 64 judges at step S907 that the reduction in a residual quantity of the battery 5 is predicted.

Accordingly, an occupant of the vehicle can lower the electric power consumed in current consumers to prevent the battery 5 from having a reduced quantity of electricity in the near future.

Figure 16:
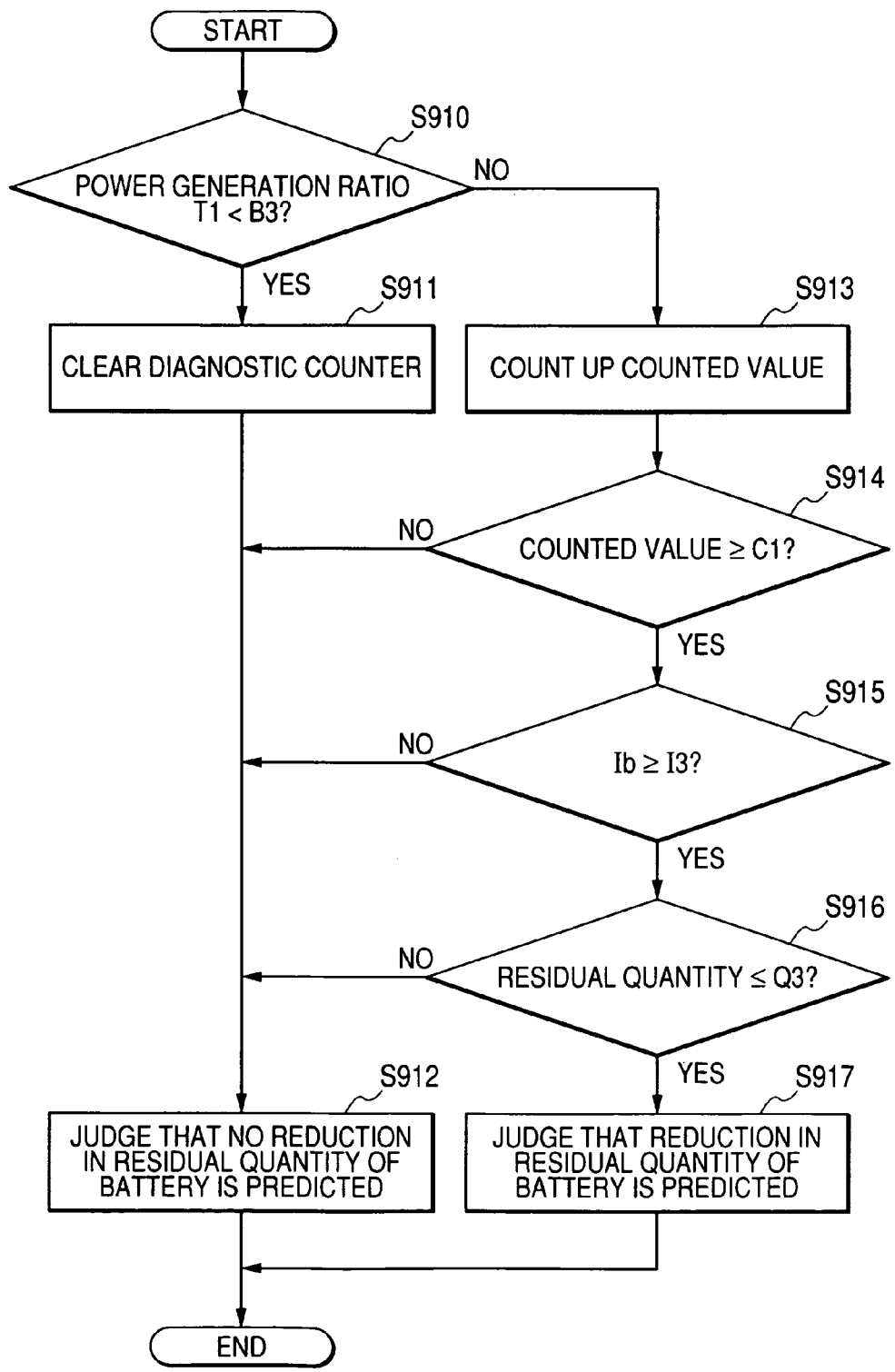
FIG. 16 is a flow chart showing another process in a judging operation at step S109 shown in FIG. 7.

This prediction is not limited to the process shown in FIG. 15. FIG. 16 is a flow chart showing another process in the judgment at step S109. The microcomputer 64 performs a process shown in FIG. 16 at step S109 for the judgment on the prediction of the reduced battery capacity.

When the power generation ratio T1 of the alternator 3 set at a high value is continued, it is apparent that the alternator 3 is normally operated so as to adequately charge the battery 3. However, when electric current discharged from the battery 3 to current consumers is extremely large, a residual quantity of the battery 5 is sometimes lowered. When this residual quantity is lowered, the current consumers now sufficiently receiving electric current will be not able to sufficiently receive electric current from the battery 5 in the near future.

As shown in FIG. 16, at step S910, the microcomputer 64 judges whether or not the power generation ratio T1 contained in the power generation condition signal is smaller than a predetermined ratio value B3. When the power generation ratio T1 is smaller the predetermined ratio value B3 (affirmative judgment), a power generation ratio diagnostic counter is cleared or reset at step S911. Then, at step S912, the microcomputer 64 judges that no reduction in a residual quantity of the battery 5 is predicted.

In contrast, when the power generation ratio T1 is equal to or larger than the predetermined ratio value B3 (negative judgment at step S910), the diagnostic counter counts up a counted value at step S913. Then, at step S914, the microcomputer 64 judges whether or not the counted value of the counter is equal to or higher than a predetermined count value C1. In other words, the microcomputer 64 calculates a continuation time, during which the power generation ratio T1 equal to or larger than the predetermined ratio value is satisfied, and judges whether or not the continuation time is longer than a predetermined time value. In case of the negative judgment at step S914, the microcomputer 64 recognizes that the continuation time is not sufficient to judge the battery capacity, and the microcomputer 64 judges at step S912 that no reduction in a residual quantity of the battery 5 is predicted. In case of the affirmative judgment at step S914, the microcomputer 64 recognizes that the continuation time is sufficient to judge the battery capacity. Therefore, the microcomputer 64 judges at step S915 whether or not the electric current Ib discharged from the battery 5 is equal to or larger than a predetermined current value I3. In case of the negative judgment at step S915, the microcomputer 64 judges at step S912 that no reduction in a residual quantity of the battery 5 is predicted. In case of the affirmative judgment at step S915, the microcomputer 64 judges at step S916 whether or not a residual quantity of the battery 5 is equal to or smaller than a predetermined electricity value Q3. In case of the negative judgment at step S916, the microcomputer 64 judges at step S912 that no reduction in a residual quantity of the battery 5 is predicted. In case of the affirmative judgment at step S916, the microcomputer 64 judges at step S917 that the reduction in a residual quantity of the battery 5 is predicted.

Accordingly, an occupant of the vehicle can lower the electric power consumed in the current consumers to prevent the battery 5 from having a reduced quantity of electricity in the near future.

Thereafter, at step S110, the microcomputer 64 obtains a result of the judgment such as a failure occurring in the communication line 9 (step S205 shown in FIG. 8), a failure occurring in the detecting unit 65, 66 or 67 (step S305 shown in FIG. 9), a failure occurring in the alternator 3 (step S403 shown in FIG. 10), a battery short occurring in the battery 5 (step S505 shown in FIG. 11), a low battery voltage (step S605 shown in FIG. 12), a disconnection of the charging line 42 (step S705 shown in FIG. 13), a disconnection of the battery terminal (step S805 shown in FIG. 14), or the prediction of a reduced battery capacity (step S905 shown in FIG. 15). Then, the microcomputer 64 induces the block 90 to store a display signal indicating the result of the judgment, and the unit 69 notifies the result of the judgment to the display 7 in response to the display signal. The display 7 outputs the result of the judgment. For example, when the microcomputer 64 predicts a reduced battery capacity at step S109, the PWM processing block 92 sends a PWM signal having a predetermined high-low pattern to the driver 94, and the driver 94 repeatedly turns on and off the transistor 96 in response to the PWM signal. In response to the turning on and off of the transistor 96, the display 7 flickers, is switched on at a low brightness, or repeatedly changes the brightness while gradually increasing the brightness. When the microcomputer 64 obtained another result of the judgment at one of the steps S101 to S109, the PWM processing block 92 sends a PWM signal fixed at a high level to the driver 94 to continuously set the driver 94 in an on state, and the display 7 is continuously lit on. In this case, the PWM signal may be set to have a high level at a predetermined ratio.

As described above, in this device 6 of the power control system 8, not only the microcomputer 64 produces the power generation control signal, but also the microcomputer 64 obtains results of judgments such as a failure occurring in the communication line 9, a failure occurring in the detecting unit 65, 66 or 67, a failure occurring in the alternator 3, a battery short occurring in the battery 5, a low battery voltage, a disconnection of the charging line 42, a disconnection of the battery terminal and the prediction of a reduced battery capacity. Then, the device notifies the result of each judgment to an occupant of the vehicle.

Accordingly, the system 8 can notify the results of the judgments without any data processing unit privately used for performing the judgments, so that the system can be manufactured at a low cost.

Further, the display 7 is installed in an instrument panel of the vehicle and is used to indicate the operation of the alternator 3. This display 7 is also used to output the results of the judgments notified by the notifying unit 69. Accordingly, the increase in the area of the panel for on-board installation can be suppressed. Further, because the display 7 is installed in the instrument panel, a failure or the like in the alternator 3, the battery 5 or one of the detecting units 65 to 67 can be reliably notified to an occupant of the vehicle.

Moreover, because the system 8 notifies the occurrence of a failure or the like without using any electronic control unit (ECU), the processing load on the ECU can be effectively reduced.

Furthermore, the system 8 detects a failure of the battery 5 and a failure of the detecting units 65 to 67, in addition to a failure of the alternator 3. Accordingly, the precision in the failure judgment can be heightened.

This embodiment should not be construed as limiting the present invention to the structure of the embodiment. For example, in this embodiment, the system 8 performs the judgments at steps S102 to S109. However, the system 8 may perform only a part of the judgments.

What is claimed is:

1. A power control system of a vehicle, comprising:
   a battery;
   an alternator that generates electric power and charges the battery with the electric power;
   a battery condition detecting device that detects conditions of the battery; and
   a communication line through which the alternator and the battery condition detecting device communicate with each other,
   wherein the battery condition detecting device comprises:
      a battery current detecting unit that detects a first electric current supplied from the alternator to the battery and a second electric current discharged from the battery;
      a battery voltage detecting unit that detects a voltage of the battery at a terminal of the battery;
      a battery temperature detecting unit that detects a temperature of the battery;
      a communicating unit that receives a power generation condition signal containing a power generation condition of the alternator from the alternator through the communication line;
      a malfunction judging unit that judges, from the electric currents detected by the battery current detecting unit, the battery voltage detected by the battery voltage detecting unit, the battery temperature detected by the battery temperature detecting unit and the power generation condition signal received by the communicating unit, whether or not a malfunction has occurred in one of the alternator, the battery and the detecting units or the occurrence of a malfunction is predicted; and
      a notifying unit that notifies the occurrence of the malfunction or the prediction of the malfunction occurrence in response to the judgment of the malfunction judging unit that a malfunction has occurred in one of the alternator, the battery and the detecting units or the occurrence of the malfunction is predicted,
      wherein the communicating unit is adapted to receive the power generation condition signal containing failure information, which indicates a content of a failure occurring in the alternator, as the power generation condition of the alternator, and
      wherein the communicating unit is adapted to receive the power generation condition signal further containing a voltage of the electric power, a power generation ratio in the alternator, a rotational speed in the alternator and an exciting current flowing through the alternator as power generation conditions of the alternator.

2. The system according to claim 1, wherein the communicating unit is adapted to receive the power generation condition signal containing failure information, which indicates a failure occurring in the alternator, as the power generation condition of the alternator.

3. A power control system of a vehicle, comprising:
   a battery;
   an alternator that generates electric power and charges the battery with the electric power;
   a battery condition detecting device that detects conditions of the battery; and
   a communication line through which the alternator and the battery condition detecting device communicate with each other,
   wherein the battery condition detecting device comprises:
      a battery current detecting unit that detects a first electric current supplied from the alternator to the battery and a second electric current discharged from the battery;
      a battery voltage detecting unit that detects a voltage of the battery at a terminal of the battery;
      a battery temperature detecting unit that detects a temperature of the battery;
      a communicating unit that receives a power generation condition signal containing a power generation condition of the alternator from the alternator through the communication line;
      a malfunction judging unit that judges, from the electric currents detected by the battery current detecting unit, the battery voltage detected by the battery voltage detecting unit, the battery temperature detected by the battery temperature detecting unit and the power generation condition signal received by the communicating unit, whether or not a malfunction has occurred in one of the alternator, the battery and the detecting units or the occurrence of a malfunction is predicted; and
      a notifying unit that notifies the occurrence of the malfunction or the prediction of the malfunction occurrence in response to the judgment of the malfunction judging unit that a malfunction has occurred in one of the alternator, the battery and the detecting units or the occurrence of the malfunction is predicted,
      wherein the communicating unit is adapted to receive the power generation condition signal containing failure information, which indicates a content of a failure occurring in the alternator, as the power generation condition of the alternator, and
      wherein the content of the failure in the failure information is power generation stop, non-controlled power generation, overheat, or low voltage of the generated power.

4. A power control system of a vehicle, comprising:
   a battery;
   an alternator that generates electric power and charges the battery with the electric power;
   a battery condition detecting device that detects conditions of the battery; and
   a communication line through which the alternator and the battery condition detecting device communicate with each other,
   wherein the battery condition detecting device comprises:
      a battery current detecting unit that detects a first electric current supplied from the alternator to the battery and a second electric current discharged from the battery;
      a battery voltage detecting unit that detects a voltage of the battery at a terminal of the battery;
      a battery temperature detecting unit that detects a temperature of the battery;

a communicating unit that receives a power generation condition signal containing a power generation condition of the alternator from the alternator through the communication line;

a malfunction judging unit that judges, from the electric currents detected by the battery current detecting unit, the battery voltage detected by the battery voltage detecting unit, the battery temperature detected by the battery temperature detecting unit and the power generation condition signal received by the communicating unit, whether or not a malfunction has occurred in one of the alternator, the battery and the detecting units or the occurrence of a malfunction is predicted; and a notifying unit that notifies the occurrence of the malfunction or the prediction of the malfunction occurrence in response to the judgment of the malfunction judging unit that a malfunction has occurred in one of the alternator, the battery and the detecting units or the occurrence of the malfunction is predicted, wherein the malfunction judged in the malfunction judging unit is a failure occurring in the battery current detecting unit, a failure occurring in the battery voltage detecting unit, a failure occurring in the battery temperature detecting unit, a failure occurring in the alternator, a failure occurring in the battery, a disconnection of the communication line from the alternator or the battery condition detecting device, a disconnection of a charging line, through which the battery is charged with the electric power of the alternator, from the alternator, or a disconnection of the charging line from a terminal of the battery.

5. The system according to claim 1, wherein the malfunction judging unit is adapted to judge, in response to the power generation condition signal indicating a failure occurring in the alternator, that a failure has occurred in the alternator.

6. A power control system of a vehicle, comprising:
a battery;
an alternator that generates electric power and charges the battery with the electric power;
a battery condition detecting device that detects conditions of the battery; and
a communication line through which the alternator and the battery condition detecting device communicate with each other,
wherein the battery condition detecting device comprises:
a battery current detecting unit that detects a first electric current supplied from the alternator to the battery and a second electric current discharged from the battery;
a battery voltage detecting unit that detects a voltage of the battery at a terminal of the battery;
a battery temperature detecting unit that detects a temperature of the battery;
a communicating unit that receives a power generation condition signal containing a power generation condition of the alternator from the alternator through the communication line;
a malfunction judging unit that judges, from the electric currents detected by the battery current detecting unit, the battery voltage detected by the battery voltage detecting unit, the battery temperature detected by the battery temperature detecting unit and the power generation condition signal received by the communicating unit, whether or not a malfunction has occurred in one of the alternator, the battery and the detecting units or the occurrence of a malfunction is predicted; and a notifying unit that notifies the occurrence of the malfunction or the prediction of the malfunction occurrence in response to the judgment of the malfunction judging unit that a malfunction has occurred in one of the alternator, the battery and the detecting units or the occurrence of the malfunction is predicted, wherein the malfunction judging unit is adapted to calculate a quantity of electricity accumulated in the battery from the electric currents detected by the battery current detecting unit and to judge, in response to the power generation condition signal indicating a voltage of the electric power lower than a predetermined voltage value and a calculation result indicating an accumulated quantity of the electricity lower than a predetermined electricity value, that a failure has occurred in the alternator so as to lower the voltage of the electric power.

7. A power control system of a vehicle, comprising:
a battery;
an alternator that generates electric power and charges the battery with the electric power;
a battery condition detecting device that detects conditions of the battery; and
a communication line through which the alternator and the battery condition detecting device communicate with each other,
wherein the battery condition detecting device comprises:
a battery current detecting unit that detects a first electric current supplied from the alternator to the battery and a second electric current discharged from the battery;
a battery voltage detecting unit that detects a voltage of the battery at a terminal of the battery;
a battery temperature detecting unit that detects a temperature of the battery;
a communicating unit that receives a power generation condition signal containing a power generation condition of the alternator from the alternator through the communication line;
a malfunction judging unit that judges, from the electric currents detected by the battery current detecting unit, the battery voltage detected by the battery voltage detecting unit, the battery temperature detected by the battery temperature detecting unit and the power generation condition signal received by the communicating unit, whether or not a malfunction has occurred in one of the alternator, the battery and the detecting units or the occurrence of a malfunction is predicted; and a notifying unit that notifies the occurrence of the malfunction or the prediction of the malfunction occurrence in response to the judgment of the malfunction judging unit that a malfunction has occurred in one of the alternator, the battery and the detecting units or the occurrence of the malfunction is predicted, wherein the malfunction judging unit is adapted to calculate a continuation time, during which the battery voltage detected by the battery voltage detecting unit is lower than a predetermined voltage value while the battery current detected by the battery current detecting unit is lower than a predetermined current value, and to judge, in response to the continuation time being longer than a predetermined time value, that a failure due to battery short has occurred in the battery.

8. A power control system of a vehicle, comprising:
a battery;
an alternator that generates electric power and charges the battery with the electric power;

a battery condition detecting device that detects conditions of the battery; and a communication line through which the alternator and the battery condition detecting device communicate with each other, wherein the battery condition detecting device comprises:
- a battery current detecting unit that detects a first electric current supplied from the alternator to the battery and a second electric current discharged from the battery;
- a battery voltage detecting unit that detects a voltage of the battery at a terminal of the battery;
- a battery temperature detecting unit that detects a temperature of the battery;
- a communicating unit that receives a power generation condition signal containing a power generation condition of the alternator from the alternator through the communication line;
- a malfunction judging unit that judges, from the electric currents detected by the battery current detecting unit, the battery voltage detected by the battery voltage detecting unit, the battery temperature detected by the battery temperature detecting unit and the power generation condition signal received by the communicating unit, whether or not a malfunction has occurred in one of the alternator, the battery and the detecting units or the occurrence of a malfunction is predicted; and
- a notifying unit that notifies the occurrence of the malfunction or the prediction of the malfunction occurrence in response to the judgment of the malfunction judging unit that a malfunction has occurred in one of the alternator, the battery and the detecting units or the occurrence of the malfunction is predicted, wherein the malfunction judging unit is adapted to calculate a continuation time, during which a differential voltage obtained by subtracting the battery voltage detected by the battery voltage detecting unit from a voltage of the electric power contained in the power generation condition signal is larger than a predetermined differential voltage value, and to judge, in response to the continuation time being longer than a predetermined time value, that a disconnection of a charging line, through which the battery is charged with the electric power of the alternator, from the alternator or the battery has occurred in the battery.

9. A power control system of a vehicle, comprising:
a battery;
an alternator that generates electric power and charges the battery with the electric power;
a battery condition detecting device that detects conditions of the battery; and
a communication line through which the alternator and the battery condition detecting device communicate with each other,
wherein the battery condition detecting device comprises:
- a battery current detecting unit that detects a first electric current supplied from the alternator to the battery and a second electric current discharged from the battery;
- a battery voltage detecting unit that detects a voltage of the battery at a terminal of the battery;
- a battery temperature detecting unit that detects a temperature of the battery;
- a communicating unit that receives a power generation condition signal containing a power generation condition of the alternator from the alternator through the communication line;
- a malfunction judging unit that judges, from the electric currents detected by the battery current detecting unit, the battery voltage detected by the battery voltage detecting unit, the battery temperature detected by the battery temperature detecting unit and the power generation condition signal received by the communicating unit, whether or not a malfunction has occurred in one of the alternator, the battery and the detecting units or the occurrence of a malfunction is predicted; and
- a notifying unit that notifies the occurrence of the malfunction or the prediction of the malfunction occurrence in response to the judgment of the malfunction judging unit that a malfunction has occurred in one of the alternator, the battery and the detecting units or the occurrence of the malfunction is predicted, wherein the malfunction judging unit is adapted to calculate a continuation time, during which the battery current detected by the battery current detecting unit is approximately equal to zero while failure information indicating a failure of the alternator does not exist in the power generation condition signal received by the malfunction judging unit, and to judge, in response to the continuation time being longer than a predetermined time value, that a charging line, through which the battery is charged with the electric power of the alternator, is disconnected from a terminal of the battery.

10. A power control system of a vehicle, comprising:
a battery;
an alternator that generates electric power and charges the battery with the electric power;
a battery condition detecting device that detects conditions of the battery; and
a communication line through which the alternator and the battery condition detecting device communicate with each other,
wherein the battery condition detecting device comprises:
- a battery current detecting unit that detects a first electric current supplied from the alternator to the battery and a second electric current discharged from the battery;
- a battery voltage detecting unit that detects a voltage of the battery at a terminal of the battery;
- a battery temperature detecting unit that detects a temperature of the battery;
- a communicating unit that receives a power generation condition signal containing a power generation condition of the alternator from the alternator through the communication line;
- a malfunction judging unit that judges, from the electric currents detected by the battery current detecting unit, the battery voltage detected by the battery voltage detecting unit, the battery temperature detected by the battery temperature detecting unit and the power generation condition signal received by the communicating unit, whether or not a malfunction has occurred in one of the alternator, the battery and the detecting units or the occurrence of a malfunction is predicted; and
- a notifying unit that notifies the occurrence of the malfunction or the prediction of the malfunction occurrence in response to the judgment of the malfunction judging unit that a malfunction has occurred in one of the alternator, the battery and the detecting units or the occurrence of the malfunction is predicted, wherein the malfunction judging unit is adapted to calculate a quantity of electricity accumulated in the battery from the electric currents detected by the battery current detecting unit, to calculate a continuation time, during which a calculation result indicating an accumulated quantity of the electricity is lower than a predetermined electricity value while the battery voltage detected by the battery voltage detecting unit is lower than a predetermined voltage value, and to judge, in response to the continuation time being longer than a predetermined time value, that the battery voltage is low due to a failure occurring in the battery.

11. A power control system of a vehicle, comprising:
a battery;
an alternator that generates electric power and charges the battery with the electric power;
a battery condition detecting device that detects conditions of the battery; and
a communication line through which the alternator and the battery condition detecting device communicate with each other,
wherein the battery condition detecting device comprises:
a battery current detecting unit that detects a first electric current supplied from the alternator to the battery and a second electric current discharged from the battery;
a battery voltage detecting unit that detects a voltage of the battery at a terminal of the battery;
a battery temperature detecting unit that detects a temperature of the battery;
a communicating unit that receives a power generation condition signal containing a power generation condition of the alternator from the alternator through the communication line;
a malfunction judging unit that judges, from the electric currents detected by the battery current detecting unit, the battery voltage detected by the battery voltage detecting unit, the battery temperature detected by the battery temperature detecting unit and the power generation condition signal received by the communicating unit, whether or not a malfunction has occurred in one of the alternator, the battery and the detecting units or the occurrence of a malfunction is predicted; and
a notifying unit that notifies the occurrence of the malfunction or the prediction of the malfunction occurrence in response to the judgment of the malfunction judging unit that a malfunction has occurred in one of the alternator, the battery and the detecting units or the occurrence of the malfunction is predicted,
wherein the malfunction judging unit is adapted to calculate a continuation time, during which the malfunction judging unit receives no power generation condition signal, and to judge, in response to the continuation time being longer than a predetermined time value, that a disconnection of the communication line from the alternator or the battery condition detecting device has occurred.

12. A power control system of a vehicle, comprising:
a battery;
an alternator that generates electric power and charges the battery with the electric power;
a battery condition detecting device that detects conditions of the battery; and
a communication line through which the alternator and the battery condition detecting device communicate with each other,
wherein the battery condition detecting device comprises:
a battery current detecting unit that detects a first electric current supplied from the alternator to the battery and a second electric current discharged from the battery;
a battery voltage detecting unit that detects a voltage of the battery at a terminal of the battery;
a battery temperature detecting unit that detects a temperature of the battery;
a communicating unit that receives a power generation condition signal containing a power generation condition of the alternator from the alternator through the communication line;
a malfunction judging unit that judges, from the electric currents detected by the battery current detecting unit, the battery voltage detected by the battery voltage detecting unit, the battery temperature detected by the battery temperature detecting unit and the power generation condition signal received by the communicating unit, whether or not a malfunction has occurred in one of the alternator, the battery and the detecting units or the occurrence of a malfunction is predicted; and
a notifying unit that notifies the occurrence of the malfunction or the prediction of the malfunction occurrence in response to the judgment of the malfunction judging unit that a malfunction has occurred in one of the alternator, the battery and the detecting units or the occurrence of the malfunction is predicted,
wherein the malfunction judging unit is adapted to calculate a continuation time, during which a value of the battery voltage, the battery current or the battery temperature detected by the battery voltage detecting unit, the battery current detecting unit or the battery temperature detecting unit is higher than a first value or is lower than a second value lower than the first value, and to judge, in response to the continuation time being longer than a predetermined time value, that a failure has occurred in the battery voltage detecting unit, the battery current detecting unit or the battery temperature detecting unit.

13. The system according to claim 1, wherein the prediction judged in the malfunction judging unit contains a prediction of a reduced battery capacity.

14. A power control system of a vehicle, comprising:
a battery;
an alternator that generates electric power and charges the battery with the electric power;
a battery condition detecting device that detects conditions of the battery; and
a communication line through which the alternator and the battery condition detecting device communicate with each other,
wherein the battery condition detecting device comprises:
a battery current detecting unit that detects a first electric current supplied from the alternator to the battery and a second electric current discharged from the battery;
a battery voltage detecting unit that detects a voltage of the battery at a terminal of the battery;
a battery temperature detecting unit that detects a temperature of the battery;
a communicating unit that receives a power generation condition signal containing a power generation condition of the alternator from the alternator through the communication line;
a malfunction judging unit that judges, from the electric currents detected by the battery current detecting unit, the battery voltage detected by the battery voltage detecting unit, the battery temperature detected by the battery temperature detecting unit and the power generation condition signal received by the communicating unit, whether or not a malfunction has occurred in one of the alternator, the battery and the detecting units or the occurrence of a malfunction is predicted; and a notifying unit that notifies the occurrence of the malfunction or the prediction of the malfunction occurrence in response to the judgment of the malfunction judging unit that a malfunction has occurred in one of the alternator, the battery and the detecting units or the occurrence of the malfunction is predicted, wherein the malfunction judging unit is adapted to calculate a quantity of electricity accumulated in the battery from the electric currents detected by the battery current detecting unit, to calculate a continuation time, during which the second electric current discharged from the battery and detected by the battery current detecting unit is larger than a predetermined current value, and to judge, in response to the continuation time being longer than a predetermined time value, an accumulated quantity of the electricity lower than a predetermined electricity value and the power generation condition signal containing no failure information indicating a failure of the alternator, that a reduced capacity of the battery is predicted.

15. A power control system of a vehicle, comprising:
a battery;
an alternator that generates electric power and charges the battery with the electric power;
a battery condition detecting device that detects conditions of the battery; and
a communication line through which the alternator and the battery condition detecting device communicate with each other,
wherein the battery condition detecting device comprises:
a battery current detecting unit that detects a first electric current supplied from the alternator to the battery and a second electric current discharged from the battery;
a battery voltage detecting unit that detects a voltage of the battery at a terminal of the battery;
a battery temperature detecting unit that detects a temperature of the battery;
a communicating unit that receives a power generation condition signal containing a power generation condition of the alternator from the alternator through the communication line;
a malfunction judging unit that judges, from the electric currents detected by the battery current detecting unit, the battery voltage detected by the battery voltage detecting unit, the battery temperature detected by the battery temperature detecting unit and the power generation condition signal received by the communicating unit, whether or not a malfunction has occurred in one of the alternator, the battery and the detecting units or the occurrence of a malfunction is predicted; and
a notifying unit that notifies the occurrence of the malfunction or the prediction of the malfunction occurrence in response to the judgment of the malfunction judging unit that a malfunction has occurred in one of the alternator, the battery and the detecting units or the occurrence of the malfunction is predicted,
wherein the malfunction judging unit is adapted to calculate a quantity of electricity accumulated in the battery from the electric currents detected by the battery current detecting unit, to calculate a continuation time, during which the power generation condition signal received by the malfunction judging unit contains information indicating a power generation ratio of the alternator larger than a predetermined ratio value, and to judge, in response to the continuation time being longer than a predetermined time value, the second electric current larger than a predetermined current value and an accumulated quantity of the electricity lower than a predetermined electricity value, that a reduced capacity of the battery is predicted.

16. The system according to claim 3, wherein the communicating unit is adapted to receive the power generation condition signal containing failure information, which indicates a failure occurring in the alternator, as the power generation condition of the alternator.

17. The system according to claim 4, wherein the communicating unit is adapted to receive the power generation condition signal containing failure information, which indicates a failure occurring in the alternator, as the power generation condition of the alternator.

18. The system according to claim 6, wherein the communicating unit is adapted to receive the power generation condition signal containing failure information, which indicates a failure occurring in the alternator, as the power generation condition of the alternator.

19. The system according to claim 7, wherein the communicating unit is adapted to receive the power generation condition signal containing failure information, which indicates a failure occurring in the alternator, as the power generation condition of the alternator.

20. The system according to claim 8, wherein the communicating unit is adapted to receive the power generation condition signal containing failure information, which indicates a failure occurring in the alternator, as the power generation condition of the alternator.

21. The system according to claim 9, wherein the communicating unit is adapted to receive the power generation condition signal containing failure information, which indicates a failure occurring in the alternator, as the power generation condition of the alternator.

22. The system according to claim 10, wherein the communicating unit is adapted to receive the power generation condition signal containing failure information, which indicates a failure occurring in the alternator, as the power generation condition of the alternator.

23. The system according to claim 11, wherein the communicating unit is adapted to receive the power generation condition signal containing failure information, which indicates a failure occurring in the alternator, as the power generation condition of the alternator.

24. The system according to claim 12, wherein the communicating unit is adapted to receive the power generation condition signal containing failure information, which indicates a failure occurring in the alternator, as the power generation condition of the alternator.

25. The system according to claim 14, wherein the communicating unit is adapted to receive the power generation condition signal containing failure information, which indicates a failure occurring in the alternator, as the power generation condition of the alternator.

26. The system according to claim 15, wherein the communicating unit is adapted to receive the power generation condition signal containing failure information, which indicates a failure occurring in the alternator, as the power generation condition of the alternator.

27. The system according to claim 4, wherein the communicating unit is adapted to receive the power generation condition signal containing failure information, which indicates a content of a failure occurring in the alternator, as the power generation condition of the alternator.

28. The system according to claim 6, wherein the communicating unit is adapted to receive the power generation condition signal containing failure information, which indicates a content of a failure occurring in the alternator, as the power generation condition of the alternator.

29. The system according to claim 7, wherein the communicating unit is adapted to receive the power generation condition signal containing failure information, which indicates a content of a failure occurring in the alternator, as the power generation condition of the alternator.

30. The system according to claim 8, wherein the communicating unit is adapted to receive the power generation condition signal containing failure information, which indicates a content of a failure occurring in the alternator, as the power generation condition of the alternator.

31. The system according to claim 9, wherein the communicating unit is adapted to receive the power generation condition signal containing failure information, which indicates a content of a failure occurring in the alternator, as the power generation condition of the alternator.

32. The system according to claim 10, wherein the communicating unit is adapted to receive the power generation condition signal containing failure information, which indicates a content of a failure occurring in the alternator, as the power generation condition of the alternator.

33. The system according to claim 11, wherein the communicating unit is adapted to receive the power generation condition signal containing failure information, which indicates a content of a failure occurring in the alternator, as the power generation condition of the alternator.

34. The system according to claim 12, wherein the communicating unit is adapted to receive the power generation condition signal containing failure information, which indicates a content of a failure occurring in the alternator, as the power generation condition of the alternator.

35. The system according to claim 14, wherein the communicating unit is adapted to receive the power generation condition signal containing failure information, which indicates a content of a failure occurring in the alternator, as the power generation condition of the alternator.

36. The system according to claim 15, wherein the communicating unit is adapted to receive the power generation condition signal containing failure information, which indicates a content of a failure occurring in the alternator, as the power generation condition of the alternator.

37. The system according to claim 3, wherein the malfunction judging unit is adapted to judge, in response to the power generation condition signal indicating a failure occurring in the alternator, that a failure has occurred in the alternator.

38. The system according to claim 4, wherein the malfunction judging unit is adapted to judge, in response to the power generation condition signal indicating a failure occurring in the alternator, that a failure has occurred in the alternator.

39. The system according to claim 6, wherein the malfunction judging unit is adapted to judge, in response to the power generation condition signal indicating a failure occurring in the alternator, that a failure has occurred in the alternator.

40. The system according to claim 7, wherein the malfunction judging unit is adapted to judge, in response to the power generation condition signal indicating a failure occurring in the alternator, that a failure has occurred in the alternator.

41. The system according to claim 8, wherein the malfunction judging unit is adapted to judge, in response to the power generation condition signal indicating a failure occurring in the alternator, that a failure has occurred in the alternator.

42. The system according to claim 9, wherein the malfunction judging unit is adapted to judge, in response to the power generation condition signal indicating a failure occurring in the alternator, that a failure has occurred in the alternator.

43. The system according to claim 10, wherein the malfunction judging unit is adapted to judge, in response to the power generation condition signal indicating a failure occurring in the alternator, that a failure has occurred in the alternator.

44. The system according to claim 11, wherein the malfunction judging unit is adapted to judge, in response to the power generation condition signal indicating a failure occurring in the alternator, that a failure has occurred in the alternator.

45. The system according to claim 12, wherein the malfunction judging unit is adapted to judge, in response to the power generation condition signal indicating a failure occurring in the alternator, that a failure has occurred in the alternator.

46. The system according to claim 14, wherein the malfunction judging unit is adapted to judge, in response to the power generation condition signal indicating a failure occurring in the alternator, that a failure has occurred in the alternator.

47. The system according to claim 15, wherein the malfunction judging unit is adapted to judge, in response to the power generation condition signal indicating a failure occurring in the alternator, that a failure has occurred in the alternator.

48. The system according to claim 3, wherein the prediction judged in the malfunction judging unit contains a prediction of a reduced battery capacity.

49. The system according to claim 4, wherein the prediction judged in the malfunction judging unit contains a prediction of a reduced battery capacity.

50. The system according to claim 6, wherein the prediction judged in the malfunction judging unit contains a prediction of a reduced battery capacity.

51. The system according to claim 7, wherein the prediction judged in the malfunction judging unit contains a prediction of a reduced battery capacity.

52. The system according to claim 8, wherein the prediction judged in the malfunction judging unit contains a prediction of a reduced battery capacity.

53. The system according to claim 9, wherein the prediction judged in the malfunction judging unit contains a prediction of a reduced battery capacity.

54. The system according to claim 10, wherein the prediction judged in the malfunction judging unit contains a prediction of a reduced battery capacity.

55. The system according to claim 11, wherein the prediction judged in the malfunction judging unit contains a prediction of a reduced battery capacity.

56. The system according to claim 12, wherein the prediction judged in the malfunction judging unit contains a prediction of a reduced battery capacity.

57. The system according to claim 14, wherein the prediction judged in the malfunction judging unit contains a prediction of a reduced battery capacity.

58. The system according to claim 15, wherein the prediction judged in the malfunction judging unit contains a prediction of a reduced battery capacity.

* * * * *